United States Patent
Wang et al.

(10) Patent No.: US 12,464,487 B2
(45) Date of Patent: Nov. 4, 2025

(54) BACKSCATTER-BASED POSITIONING

(71) Applicant: QUALCOMM Incorporated, San Diego, CA (US)

(72) Inventors: Xiaojie Wang, Hillsborough, NJ (US); Jing Sun, San Diego, CA (US); Mohammad Tarek Fahim, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 18/060,385

(22) Filed: Nov. 30, 2022

(65) Prior Publication Data

US 2024/0179666 A1    May 30, 2024

(51) Int. Cl.
 *H04W 64/00* (2009.01)
 *G01S 13/75* (2006.01)

(52) U.S. Cl.
 CPC ............. *H04W 64/00* (2013.01); *G01S 13/75* (2013.01)

(58) Field of Classification Search
 None
 See application file for complete search history.

(56) References Cited

U.S. PATENT DOCUMENTS

2024/0080114 A1*  3/2024  Barbu ............... H04B 7/15528

FOREIGN PATENT DOCUMENTS

| WO | WO-2019149341 A1 | 8/2019 |
| WO | WO-2022199785 A1 | 9/2022 |
| WO | WO-2022200673 A1 | 9/2022 |

OTHER PUBLICATIONS

International Search Report and Written Opinion—PCT/US2023/075963—ISA/EPO—Dec. 21, 2023.

* cited by examiner

*Primary Examiner* — Adolf Dsouza
(74) *Attorney, Agent, or Firm* — QUALCOMM Incorporated

(57) ABSTRACT

Systems, methods, and devices for wireless communication that support backscatter-based positioning. A method of wireless communication includes receiving a tag device indicator that indicates a tag capability of a tag device. The method also includes generating a tag configuration associated with transmission of a backscatter signal based on a positioning reference signal (PRS). The tag configuration indicates a frequency shifting parameter based on a frequency shifting capability of a tag device, a phase scrambling parameter based on a phase scrambling capability of the tag device, or a combination thereof. The method further includes transmitting the tag configuration.

27 Claims, 13 Drawing Sheets

BACKSCATTER-BASED POSITIONING

TECHNICAL FIELD

Aspects of the present disclosure relate generally to wireless communication systems, and more particularly, to backscatter-based positioning. Some features may enable and provide improved communications, including reduced control overhead, efficient resource utilization, improved network access, improved ranging measurements, location determinations, transmission/reception point (TRP) selection, reduced interference, or a combination thereof.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Radio frequency identification (RFID) systems and devices typically include a reading device, called a reader, and one or more tag devices—e.g., RFID tag devices. The reader typically suffers from self-interference or from interference due to signals reflected in an environment proximate to the reader, such as reflections from static or moving objects. Self-interference can be a particularly acute problem when the reader operates in full-duplex mode. A tag device typically includes a wireless microchip used to tag an object for automated identification. However, the use of tag devices has not been has not been applied to current 3GPP technologies and Internet-of-Things (IOT) implementations that may include identification, monitoring, positioning, and tracking, as illustrative, non-limiting examples. Accordingly, use of tag devices applied to current 3GPP technologies, such as coexistence with user equipments (UEs), and infrastructure in frequency bands for current 3GPP technologies has yet to be established. Given the low power and limited processing capabilities of different types of tag devices, incorporation of tag devices with 3GPP technologies presents a variety of complex and technical challenges, such as limiting network congestion, overhead, and interference associated with the use of tag devices with 3GPP technologies.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is performed by a network entity. The method includes generating a tag configuration associated with transmission of a backscatter signal based on a positioning reference signal (PRS). The tag configuration includes a frequency shifting parameter based on a frequency shifting capability of a tag device, a phase scrambling parameter based on a phase scrambling capability of the tag device, or a combination thereof. The method further includes transmitting the tag configuration.

In an additional aspect of the disclosure, an apparatus includes at least one processor and a memory coupled to the at least one processor. The at least one processor is configured to generate a tag configuration associated with transmission of a backscatter signal based on a PRS. The tag configuration includes a frequency shifting parameter based on a frequency shifting capability of a tag device, a phase scrambling parameter based on a phase scrambling capability of the tag device, or a combination thereof. The at least one processor is further configured to initiate transmission of the tag configuration.

In an additional aspect of the disclosure, an apparatus includes at least one processor coupled to a memory storing processor-readable code, the at least one processor configured to execute the processor-readable code to cause the at least one processor to generate a tag configuration associated with transmission of a backscatter signal based on a PRS. The tag configuration includes a frequency shifting parameter based on a frequency shifting capability of a tag device, a phase scrambling parameter based on a phase scrambling capability of the tag device, or a combination thereof. The apparatus further includes a communication interface configured to transmit the tag configuration.

In an additional aspect of the disclosure, an apparatus includes means for generating a tag configuration associated with transmission of a backscatter signal based on a PRS. The tag configuration includes a frequency shifting parameter based on a frequency shifting capability of a tag device, a phase scrambling parameter based on a phase scrambling capability of the tag device, or a combination thereof. The apparatus further includes means for transmitting the tag configuration.

In an additional aspect of the disclosure, a non-transitory computer-readable medium stores instructions that, when executed by a processor, cause the processor to perform operations. The operations include generating a tag configuration associated with transmission of a backscatter signal based on a PRS. The tag configuration includes a frequency shifting parameter based on a frequency shifting capability of a tag device, a phase scrambling parameter based on a phase scrambling capability of the tag device, or a combination thereof. The operations further include transmitting the tag configuration.

In an additional aspect of the disclosure, a method for wireless communication is performed by a transmission/reception point (TRP). The method includes receiving, from a network entity, a TRP configuration that indicates a frequency shifting parameter, a phase scrambling parameter, or a combination thereof. Additionally the method includes transmitting, based on the TRP configuration, a PRS.

In an additional aspect of the disclosure, an apparatus includes at least one processor and a memory coupled to the at least one processor. The at least one processor is configured to receive, from a network entity, a TRP configuration that indicates a frequency shifting parameter, a phase scrambling parameter, or a combination thereof. The processor is further configured to initiate transmission of a PRS.

In an additional aspect of the disclosure, an apparatus includes at least one processor coupled to a memory storing processor-readable code, the at least one processor configured to execute the processor-readable code to cause the at least one processor to receive, from a network entity, a TRP configuration that indicates a frequency shifting parameter, a phase scrambling parameter, or a combination thereof. The apparatus further includes a communication interface configured to transmit, based on the TRP configuration, a PRS.

In an additional aspect of the disclosure, an apparatus includes means for receiving, from a network entity, a TRP configuration that indicates a frequency shifting parameter, a phase scrambling parameter, or a combination thereof. The apparatus further includes means for transmitting, based on the TRP configuration, a PRS.

In an additional aspect of the disclosure, a non-transitory computer-readable medium stores instructions that, when executed by a processor, cause the processor to perform operations. The operations include receiving, from a network entity, a TRP configuration that indicates a frequency shifting parameter, a phase scrambling parameter, or a combination thereof. The operations further include transmitting, based on the TRP configuration, a PRS.

In an additional aspect of the disclosure, a method for wireless communication is performed by a tag device. The method includes receiving a tag configuration that indicates a frequency shifting parameter based on a frequency shifting capability of the tag device, a phase scrambling parameter based on a phase scrambling capability of the tag device, or a combination thereof. Additionally, the method includes transmitting, based on the tag configuration, the backscatter signal in response to a PRS.

In an additional aspect of the disclosure, an apparatus includes at least one processor and a memory coupled to the at least one processor. The at least one processor is configured to receive a tag configuration that indicates a frequency shifting parameter based on a frequency shifting capability of the tag device, a phase scrambling parameter based on a phase scrambling capability of the tag device, or a combination thereof. The at least one processor is further configured to initiate transmission of, based on the tag configuration, the backscatter signal in response to a PRS.

In an additional aspect of the disclosure, an apparatus includes at least one processor coupled to a memory storing processor-readable code, the at least one processor configured to execute the processor-readable code to cause the at least one processor to receive a tag configuration that indicates a frequency shifting parameter based on a frequency shifting capability of the tag device, a phase scrambling parameter based on a phase scrambling capability of the tag device, or a combination thereof. The apparatus further includes a communication interface configured to transmit, based on the tag configuration, the backscatter signal in response to a PRS.

In an additional aspect of the disclosure, an apparatus includes means for receiving a tag configuration that indicates a frequency shifting parameter based on a frequency shifting capability of the tag device, a phase scrambling parameter based on a phase scrambling capability of the tag device, or a combination thereof. The apparatus further includes means for transmitting, based on the tag configuration, the backscatter signal in response to a PRS.

In an additional aspect of the disclosure, a non-transitory computer-readable medium stores instructions that, when executed by a processor, cause the processor to perform operations. The operations include receiving a tag configuration that indicates a frequency shifting parameter based on a frequency shifting capability of the tag device, a phase scrambling parameter based on a phase scrambling capability of the tag device, or a combination thereof. The operations further include transmitting, based on the tag configuration, the backscatter signal in response to a PRS.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
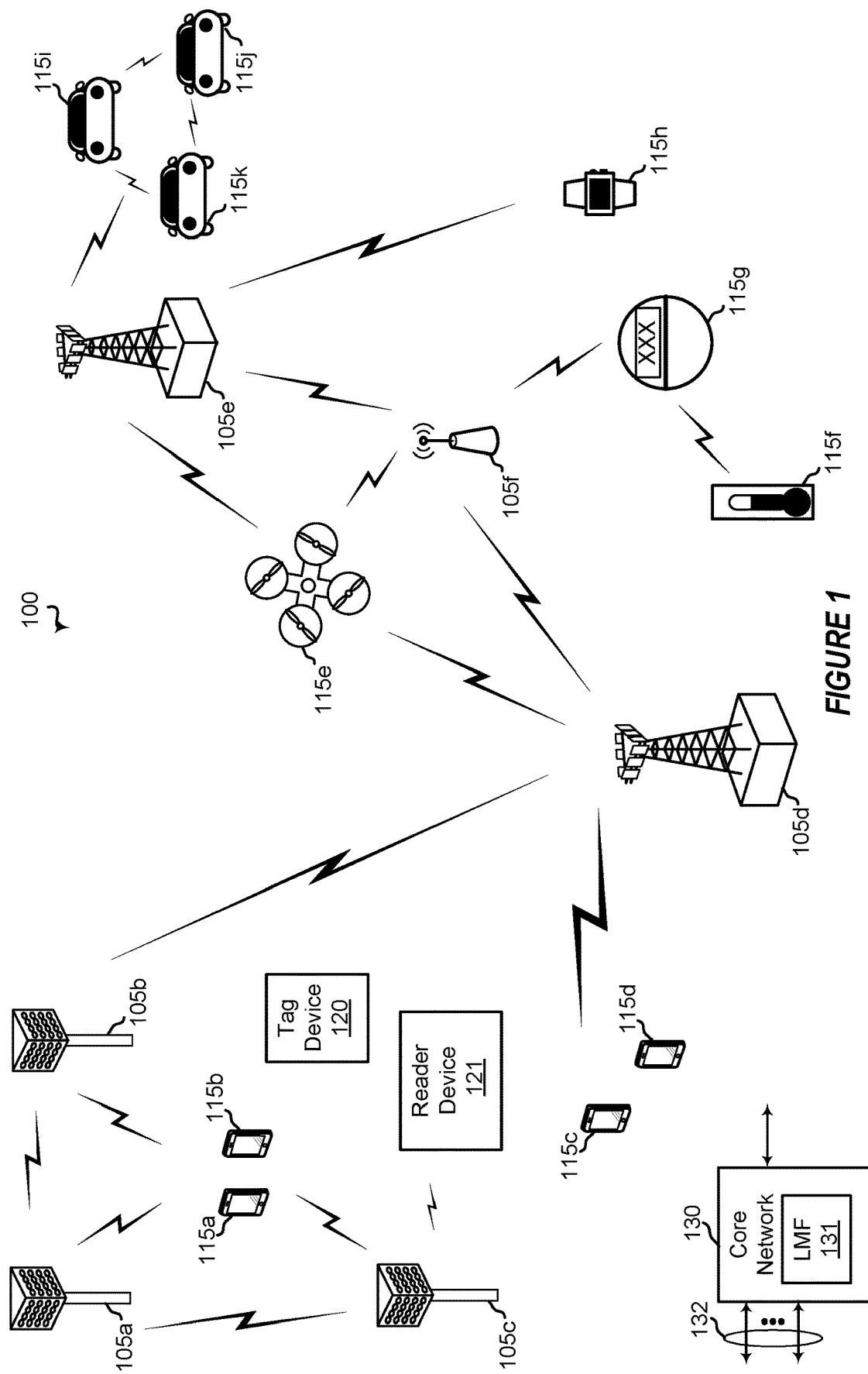
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support backscatter-based positioning. For example, the present disclosure describes positioning of a tag device, such as a passive Internet-of-Things (IOT) device, through backscatter transmission. A location management function (LMF) of a core network may be configured to determine a position, such as a two-dimensional position or a three-dimensional position, of a tag device based on one or more measurement reports received from one or more transmission/reception points (TRPs). However, various factors may negatively affect an accuracy, a precision, or both of the position determination. These factors may include self-interference, associated with a positioning reference signal (PRS) transmitted, by one or more transmit (Tx) TRPs, to a tag device, interference associated with one or more objects proximate to the tag device (e.g., the ground, vehicles, etc.), or a combination thereof.

The present disclosure describes techniques to reduce or eliminate the harmful effects of these types of interference. To illustrate, the LMF may determine a tag configuration for a tag device that indicate a frequency shifting parameter based on a frequency shifting capability of a tag device, a phase scrambling parameter based on a phase scrambling capability of the tag device, or both. For example, the tag device may frequency shift a backscatter signal to manipulate or alter a frequency of the backscatter signal, generated at the tag device in response to a PRS, to remove or avoid interference in the backscatter signal. Frequency shifting the backscattered signal may render the backscatter more detectable at one or more receive (Rx) TRPs. As another example, the tag device may phase scramble the backscattered signal so that a Rx TRP may more readily distinguish the backscatter signal from interference.

Particular implementations of the subject matter described in this disclosure may be implemented to realize one or more of the following potential advantages or benefits. In some aspects, the present disclosure provides techniques for supporting backscatter-based positioning. The techniques described facilitate determining a position, such as a two dimensional or a three dimensional position, of a tag device that has limited on-board power and computational resources, such as a passive tag device or a semi-passive tag device, by at least partially removing interference, from a backscatter signal, reflected by the tag device. Additionally, or alternatively, the techniques described herein may distinguish a backscatter signal from among a plurality of other signals, such as interference signals, based on a phase scrambling sequence imposed on the backscatter signal. In particular, during an operation to identify a position of a tag device, in addition to receipt of a backscatter signal, other extraneous signals may be received, such as signals reflected by stationary objects, moving objects, or both in a vicinity of the tag device. For example, objects near a vicinity of the tag device that might reflect signals that could interfere with the backscatter signal include the ground, moving or stationary vehicles, and the like. These reflected extraneous signals may interfere with the backscatter signal, thereby negatively affecting the accuracy, precision, or both of a determination of a position of the tag device. By frequency shifting or phase scrambling the backscatter signal, the backscatter signal may avoid or isolate interference caused by these extraneous signals, may be distinguished from other extraneous signals, or a combination thereof. By avoiding interference or being distinguishable from other extraneous signals, an accuracy and precision of determining a position of the tag device is improved.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHZ-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features.

These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IOT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a Location Management Function (LMF) 131, which is an entity in the 5G Core Network (5GC) supporting various functionality, such as managing support for different location services for one or more UEs. For example the LMF 131 may include one or more servers, such as multiple distributed servers. Base stations 105 may forward location messages to the LMF 131 and may communicate with the LMF via a NR Positioning Protocol A (NRPPa). The LMF 131 is configured to control the positioning parameters for UEs 115 and the LMF 131 can provide information to the base stations 105 and UE 115 so that action can be taken at UE 115. In some implementations, UE 115 and base station 105 are configured to communicate with the LMF 131 via an Access and Mobility Management Function (AMF).

Tag device systems typically include a tag device 120 and a reader device 121. Tag device 120 includes radio frequency identification (RFID) device or tags that include a wireless microchip used for tagging objects for automated object identification. Reader device 121, such as an RFID reader, may be configured to transmit electromagnetic signals to other devices, such as tag device 120. Reader device 121 may include one or more processors and a memory and is typically able to process data. Additionally, reader device 121 usually includes one or more transmitters and receivers. During typical operation, reader device 121 may be configured to transmit a signal, which is receivable by tag device 120 and to receive and process a signal from tag device 120 that is responsive to the transmitted signal.

In some implementations, a transmitter and a receiver of reader device 121 can be co-located (e.g., mono-static) or separately located (bi-static). For mono-static case, the self-interference may become the dominant interference of the receiver. For the bi-static case, the direct transmission from the transmitter may become a dominant interference of the received. However, in the bi-static case, a line-of-sight (LOS) signal may be used as a reference for TDoA measurement(s) if the location/distance between the transmitter and the receiver is known.

Tag devices, such as tag device 120, are categorized based on functionality or capability. For instance, tag device 120 may be categorized as one of a passive tag, a semi-passive tag, and an active tag depending on the functionality or capabilities of tag device 120. Accordingly, tag device 120 may correspond to a passive tag, a semi-passive tag, or an active tag.

Passive tags typically lack a power source, harvest energy from ambient electromagnetic signals, and have limited computational capacity, often lacking components, such as analog to digital converters (ADCs) and digital to analog converters (DACS) for signal processing. Since passive tags generally lack signal processing capability, passive tags typically include a simple circuit to reflect a received electromagnetic signal to the environment in the form of a backscatter transmission. For instance, reader device 121 may transmit an electromagnetic signal that a passive tag, such as tag device 120, may receive and at least partially reflect in the form of a backscatter signal. To elaborate, if tag device 120 is a passive tag then tag device 120 may include circuitry to at least partially reflect non-absorbed portions of electromagnetic signals received from the ambient environment, such as transmitted by reader device 121, in the form of a backscatter transmission.

Semi-passive tags usually include an on-board power source to provide energy for on-board electronic components. In general, semi-passive tags often have more computational power than passive tags. Additionally, semi-passive tags may have a limited on-board power source; however, semi-passive tags typically transmit signals through backscatter transmissions as explained above in the context of passive tags.

Active tags often include an on-board power source and more computational capacity than passive or semi-passive tags. Moreover, unlike passive and semi-passive tags that normally are unable to transmit unless a reader device, such as reader device 121, is in proximity to them, active tags are able to transmit regardless of a proximity of a reader device. Active tag devices typically include signal processing functionality, such as ADCs, DACs, and the like. Moreover, active tags often include a power source and are able to actively transmit. In particular, unlike passive and semi-passive tags that generate a backscatter signal by at least partially reflecting a transmission received from a reader device (e.g., reader device 121), active tags are capable of transmitting independently of a signal received from another device, such as reader device 121.

Additionally, tag devices, such as tag device 120, typically include a tag identification to uniquely identify the tag device. Accordingly, a tag device, such as tag device 120, may include its unique tag identification in response to receipt, at the tag device, of a transmission from reader device 121. If tag device 120 corresponds to a passive tag or a semi-passive tag, tag device 120 may be configured to at least partially reflect the transmission received from reader device 121 in the form of a backscatter signal that is readable by reader device 121. While an active tag is able to process a transmitted signal received from reader device 121, in some implementations, an active tag device may also partially reflect the received signal as a backscatter signal or may independently transmit a signal to reader device 121 in response to a signal received from reader device 121.

Tag device systems that include tag device 120 and reader device 121 may be deployed for positioning an object associated with tag device 120. For instance, tag device 120 may be affixed to an object, and reader device 121 may be configured to identify a position (e.g., a two-dimensional position, a three-dimensional position) of the object to which tag device 120 is affixed through use of backscatter-based positioning. As such, tag device systems can be deployed in a wide range of applications in which precise and accurate object positioning achieved. These applications may include automated checkout, medical application such as monitoring patients' compliance with medical directives, and law enforcement and security applications, as illustrative, non-limiting examples.

Figure 2:
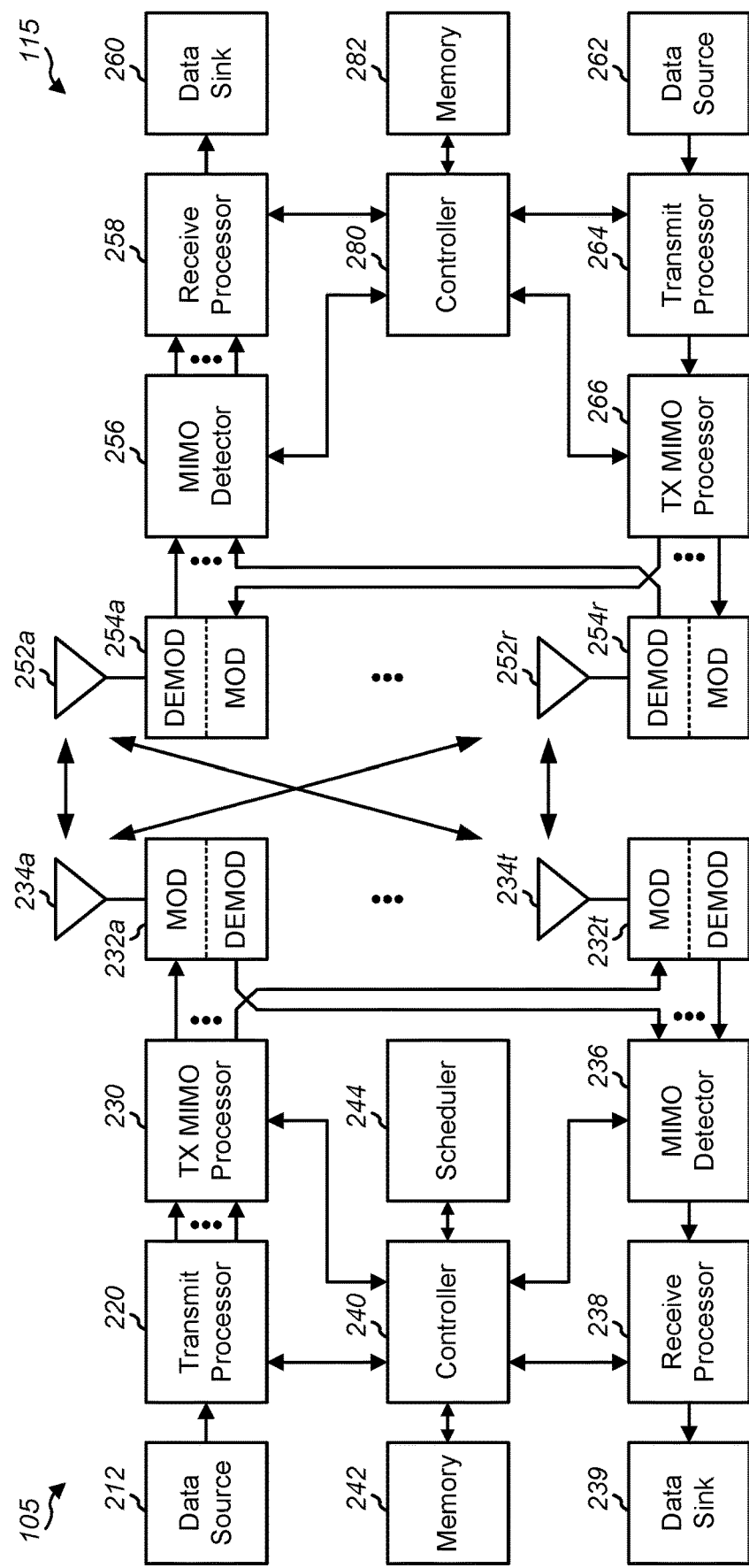
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 12, 14, or 15, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
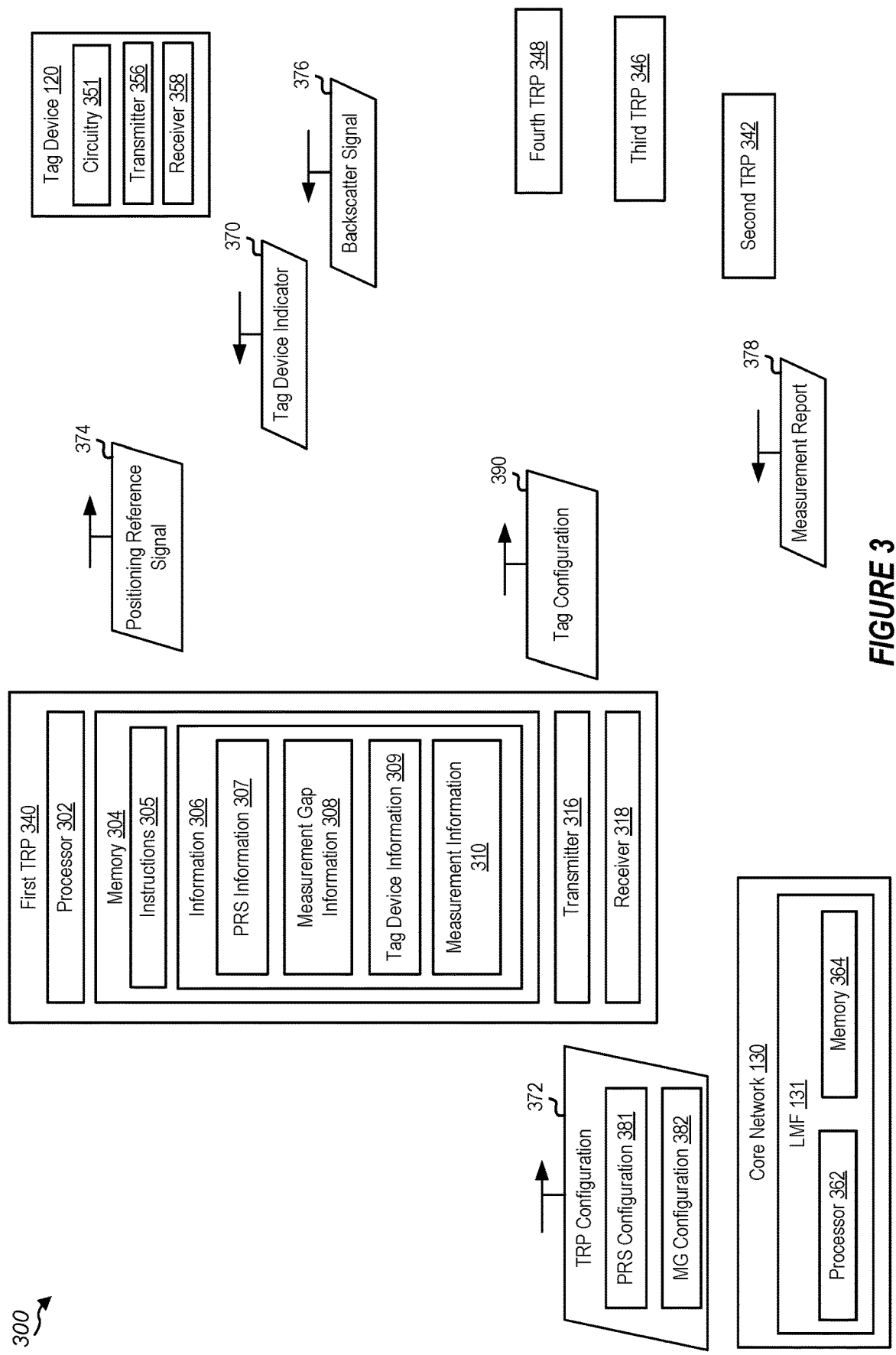
FIG. 3 is a block diagram illustrating an example wireless communication system that supports backscatter-based positioning according to one or more aspects.

FIG. 3 is a block diagram of an example wireless communications system 300 that supports backscatter-based positioning according to one or more aspects. In some examples, wireless communications system 300 may implement aspects of wireless network 100. Wireless communications system 300 includes tag device 120, a first TRP 340, a second TRP 342, a third TRP 346, a fourth TRP 348, and core network 130. Although four TRPs are illustrated, in some other implementations, wireless communications system 300 may generally include fewer or more than four TRPs.

Tag device 120 may be a RFID tag device. Additionally, tag device 120 may be a passive tag having no power source and limited computational capacity, a semi-passive tag having a limited power source and computational capacity that is equal to or more extensive than the computational capacity of a passive tag device, or an active tag, having a power source and the same or more extensive computational capacity as that the semi-passive tag device.

Tag device 120 may include a variety of components (such as structural, hardware components) used for carrying out one or more functions described herein. For example, these components may include circuitry 351, transmitter 356, and receiver 358. Circuitry 351 may include or correspond to energy harvesting circuitry, a microcontroller, one or more processors, a memory, an analog-to-digital converter (ADC), a digital to analog converter (DAC), or a combination thereof, as non-illustrative examples. Circuitry 351 may depend on whether tag device 120 is a passive tag, a semi-passive tag, or an active tag.

Transmitter 356 is configured to transmit one or more signals (e.g., backscatter signal 376 or data) to one or more other devices (e.g., one or more TRPs or reader 121). Receiver 358 is configured to receive one or more signals (e.g., positioning reference signal 374 or data) from one or more other devices (e.g., one or more TRPs, reader 121, core network 130). For example, receiver 358 may receive positioning reference signal 374 from one or more TRPs and transmitter 356 may transmit backscatter signal 376 to one or more TRPs. In some implementations, transmitter 356 and receiver 358 may be integrated in one or more transceivers. Additionally, or alternatively, transmitter 356 or receiver 358 may include or correspond to one or more components of UE 115 described with reference to FIG. 2.

Tag device 120 may include one or more components as described herein with reference to tag device 120. In some implementations, tag device 120 is a 3GPP-capable tag device, an LTE-capable tag device, a 5G-capable tag device, a 6G-capable tag device, or a combination thereof.

First TRP 340 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). In some implementations, first TRP 340 may include an interface (e.g., a communication interface) that includes transmitter 316, receiver 318, or a combination thereof. Processor 302 may be configured to execute instructions 305 stored in memory 304 to perform the operations described herein. In some implementations, processor 302 includes or corresponds to one or more of receive processor 238, transmit processor 220, and controller 240, and memory 304 includes or corresponds to memory 242.

Memory 304 includes or is configured to store instructions 305 and information 306. Information 306 may include PRS information 307, measurement gap information 308, tag device information 309, and measurement information 310.

PRS information 307 includes information that first TRP 340 uses to generate a positioning reference signal (PRS) 374. For example, PRS information 307 may include one or more parameters, such a repetition rate, a bandwidth configuration, a comb pattern configuration, or a combination thereof. The repetition rate may include or indicate a number of times within a time period that a PRS is transmitted. The comb pattern may include or indicate a configurable resource block allocation. Additionally, or alternatively, PRS information 307 may include a frequency shifting parameter, a phase scrambling parameter, or a combination thereof. In some implementations, PRS information 307 may include or indicate a waveform corresponding to PRS 374, such as phase shifting key (PSK) waveform (e.g., binary-shift keying (BPSK), quadrature phase shifting keying (QPSK)) an amplitude shifting key (ASK) waveform (e.g., on-off keying), a chirp waveform (e.g., up-chirp, down-chirp sweeping a frequency over an available bandwidth of PRS 374), or a combination thereof. In some implementations, PRS information 307 may include or indicate a sequence choice for PRS 374, such as a m-sequence or a Zadoff-Chu sequence. In some implementations, PRS information 307 may be generated or stored based on a PRS configuration (e.g., 381).

Measurement gap information 308 indicates a time period during which one or more TRPs are to monitors for PRS 374, backscatter signal 376, or a combination thereof. In some implementations, measurement gap information 308 may indicate a time period during with the one or more TRPs are to refrain from transmitting signals, such as PRS 374. For example, measurement gap information 308 may indicate a time period during which first TRP 340 refrains from scheduling one or more transmission to occur. Measurement gap information 308 may be based on measurement gap (GP) configuration 382.

Tag device information 309 includes or corresponds to information about one or more tag devices, such as tag device 120. Tag device information 309 may include information corresponding to a tag capability of tag device 120. In some implementations, tag device information 309 corresponds to information indicated by tag device indicator 370. For example, tag device information 309 may include a frequency shifting capability of tag device 120, a phase scrambling capability of tag device 120, or a combination thereof. The frequency shifting capability may include or correspond to a capability of tag device 120 to manipulate or change a frequency of reflected backscatter signal 376 generated at tag device 120. Examples of the frequency shifting capability include a bandwidth of backscatter signal 376, frequency shift waveforms configurable by tag device 120, a time delay associated with switching a frequency of backscatter signal 376, an amount of time during which tag device 120 is configurable to perform frequency shifting operations, a power level available, at tag device 120, for performing the frequency shifting operations, or a combination thereof. The phase scrambling capability may include or correspond to a capability of tag device 120 to manipulate or change a phase of reflected backscatter signal 376 generated at tag device. Examples of the phase scrambling capability include supported phase values of tag device 120, scaling factor values selectable by tag device 120, an amount of time during which a phase scattering operation is performable, an amount of power available to tag device 120 to perform the phase scattering operation, or a combination thereof.

Tag device information 309 may alternatively or additionally include or indicate a tag type, a bandwidth, a PRS slot periodicity, a sensitivity, a group delay (e.g., a tag delay), or a combination thereof. A tag type may correspond to whether the tag device (e.g., tag device 120) is a passive tag, a semi-passive tag, or an active tag. Bandwidth may correspond to a bandwidth over which tag device 120 is capable of communicating. PRS slot periodicity may correspond to timeframes during which or how often tag device 120 expects to receive PRS 374. Sensitivity may correspond to a sensitivity of tag device 120 to PRS 374, such as transmit power of the PRS, a distance from a TRP at which tag device 120 can successfully receive a signal, or a combination thereof. The tag delay (e.g., the group delay) may correspond to an amount of time for tag device 120 to process PRS 374 and to generate backscatter signal 376 in response to receipt, at tag device 120, or PRS 374. For example, the tag delay, such as a radio frequency (RF) group delay, may include or be based on one or more components (e.g., circuitry 351, transmitter 356, receiver 358, or a combination thereof, of the tag device. The one or more components are configured to receive a positioning reference signal, generate a backscatter signal based on the positioning reference signal, and transmit the backscatter signal. In some implementations, the tag delay is an amount of time between tag device 120 receiving a positioning reference signal and transmitting a backscatter signal based on the received positioning reference signal.

Measurement information 310 includes or corresponds to one or more propagation times associated with backscatter signal 376. For example, when TRP 340 is configured as a Tx TRP, measurement information 310 may include a transmit time of PRS 374, a receive time of backscatter signal 376, an amount of time that elapses from transmission of PRS 374 to receipt of backscatter signal 376, or a combination thereof. In some implementations, when first TRP is configured as an Rx TRP, measurement information 310 may include a receive time of PRS 374, a receive time of backscatter signal 376, an amount of time that elapses from receipt of PRS 374 to receipt of backscatter signal 376, or a combination thereof. First TRP 340 may be configured to generate a measurement report based on measurement information 310. In some implementations, measurement information 310 indicates a channel condition monitored or experienced by TRP 340-346, an interference monitored or experienced by TRP 340-346, or a combination thereof.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, core network 130, another TRP, or a network entity. Additionally, or alternatively transmitter 316 may transmit a positioning reference signal (e.g., 374) and receive 318 may receive a backscatter signal (e.g., 376). In some implementations, transmitter 316 and receiver 318 may be integrated in one or more transceivers. Additionally, or alternatively, transmitter 316 or receiver 318 may include or correspond to one or more components of as described with reference to UE 115 or base station 105 of FIG. 2. In some implementations, transmitter 316 and receiver 318 may be configured to operate in a full duplex mode.

In some implementations, first TRP 340 may include one or more antenna arrays. The antenna array may include multiple antenna elements configured to perform wireless communications with other devices, such as with core network 130. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam. In some implementations, first TRP 340 may be configured as or include a reader device, such as an RFID reader device.

Second TRP 342, third TRP 346, and fourth TRP 348 may include or correspond to first TRP 340. For example, second TRP 342, third TRP 346, or fourth TRP 348 may include one or more similar components as first TRP 340. In some implementations, first TRP 340, second TRP 342, third TRP 346, or fourth TRP 348 may include or correspond to reader device 121. In some implementations, first TRP 340, second TRP 342, third TRP 346, or fourth TRP 348 may be synchronized, such as time synchronized. For example, multiple TRPs may be configured to enable TDOA or TOA backscatter positioning of tag device 120 by LMF 131.

Core network 130 may include a 3GPP core network, a 4G core network, a 5G core, or an evolved packet core (EPC). Core network 130 may be coupled, such as communicatively coupled, to one or more network entities, such as TRP 34,0, 342, 346, or 348. Core network 130 may include or correspond to LMF 131.

Although shown and described as being included in core network 130, LMF 131 may be distinct from core network 130 in some implementations. For example the LMF 131 may include one or more servers, such as multiple distributed servers. LMF 131 may be configured to support various functionality, such as managing support for different location services for one or more UEs, one or more tag devices, or one or more network entities. For example, LMF 131 is configured to control the positioning parameters for TRP 340, 342, 346, or 348 or tag device 120 and LMF 131 can provide information to TRP 340, 342, 346, or 348 or tag device 120 so that action or operation can be taken at TRP 340, 342, 346, or 348. TRPs 340, 342, 346, or 348, such as base station 105 or a reader device, may forward location messages to the LMF 131 and may communicate with the LMF 131 via a protocol, such as a NR Positioning Protocol A (NRPPa). In some implementations, TRP 340, 342, 346, or 348, tag device 120, or a combination thereof are configured to communicate with the LMF 131 via an Access and Mobility Management Function (AMF).

LMF 131 may include a variety of components (such as structural, hardware components) used for carrying out one or more functions described herein. For example, these components may include one or more processors 362 (hereinafter referred to collectively as "processor 362"), one or more memory devices 364 (hereinafter referred to collectively as "memory 364"), one or more transmitters, and one or more receivers. In some implementations, LMF 131 may include an interface (e.g., a communication interface) that includes the one or more transmitters, the one or more receivers, or a combination thereof. Processor 362 may be configured to execute instructions stored in memory 364 to perform the operations described herein. In some implementations, with reference to components of base station 105 of FIG. 2, processor 362 includes or corresponds to one or more of receive processor 238, transmit processor 220, and controller 240, and memory 354 includes or corresponds to memory 242.

In some implementations, LMF 131 is configured to support backscatter-based positioning. For example, LMF 131 may be configured to receive tag device indicator 370 that indicates a tag capability of a tag device 120. In some implementations, LMF 131 may be configured to transmit, to a first TRP of a plurality of TRPs, PRS configuration 381 associated with a PRS, the PRS configuration based on the tag capability. For example, LMF 131 may be configured to transmit, to first TRP 340 of TRPs 340-348, PRS configuration 381 associated with PRS 374. In some implementations, LMF 131 may be configured to receive measurement report 378 from a second TRP, such as second-fourth TRPs 342-348, based on backscatter signal 376 of PRS 374 transmitted by first TRP 340. Additionally, or alternatively, LMF 131 may be configured to transmit TRP configuration 372 to the plurality of TRPs, such as first TRP through fourth TRP 340-348. TRP configuration 372 may indicate, for example, that first TRP 340 is designated as a transmit (Tx) TRP and that one or more of second through fourth TRPs 342-346 are designated as receive (Rx) TRPs.

In some implementations, LMF 131 of core network 130 may be configured to determine a position of tag device 120 based on one or more measurement reports (referred to collectively as "measurement report 378"). Determining the position of tag device 120 may include calculating a time of arrival (TOA), a time difference of arrival (TDOA), an angle of arrival (AoA), or a combination thereof. Moreover, LMF 131 may be configured to transmit position data that indicates the position of tag device 120.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP. In some other implementations, wireless communications system 300 implements a 6G network. As described herein, wireless communications system 300 enables or supports identification, tracking, monitoring, and coexistence of tag device 120 with devices and infrastructure in frequency bands for current 3GPP technologies.

During operation of wireless communications system 300, LMF 131 may transmit a request to tag device 120 for a tag capability of tag device 120. Tag device 120 may send tag device indicator 370 responsive to the request. In some implementations, tag device indicator 370 may be received by core network 130, LMF 131, one or more TRPs 340-348, or a combination thereof.

LMF 131 may receive tag device indicator 370 that indicates the tag capability of tag device 120. The tag capability may include a frequency shifting capability of tag device 120, a phase scrambling capability of tag device 120, or a combination thereof. In some implementations, the frequency shifting capability of tag device 120 includes a bandwidth of backscatter signal 376, frequency shift waveforms configurable by tag device 120 (e.g., a waveform implementing a single-sided frequency shift, a waveform implementing a double-sided frequency shift, a waveform implementing a double-sided frequency shift with a ninety degree phase shift, etc.), a time delay associated with switching a frequency of backscatter signal 376, an amount of time during which tag device 120 is configurable to perform frequency shifting operations, a power level available, at tag device 120, for performing the frequency shifting operations, or a combination thereof. In some implementations, the phase scrambling capability includes supported phase values of tag device 120 (e.g., scaling factor values selectable by the tag device), an amount of time during which a phase scattering operation is performable, an amount of power available to tag device 120 to perform the phase scattering operation, or a combination thereof.

LMF 131 may generate tag configuration 390 associated with transmission of backscatter signal 376, such as backscatter signal that is based on positioning reference signal (PRS) 374. Tag configuration 390 may include or indicate a frequency shifting parameter based on a frequency shifting capability of tag device 120, a phase scrambling parameter based on a phase scrambling capability of tag device 120, or both. In some implementations, the frequency shifting parameter includes or indicates a backscatter frequency offset value of backscatter signal 376, an indication of a frequency shift waveform, a timeframe during which a frequency shifting operation is to be performed, or a combination thereof. The frequency shifting parameter may be configured based on the frequency shifting capability of tag device 120. In some implementations, the phase scrambling parameter includes or indicates a scaling factor, a phase sequence with phase shifts, a length of the phase sequence, or a combination thereof, each corresponding to backscatter signal 376. The scaling factor (sometimes referred to as a "K scaling factor") may be a proportional value of a frequency of PRS 374. For instance, a frequency of backscatter signal 376 may equal a frequency of PRS 374 multiplied by the scaling factor. The phase scrambling parameter may be generated based on or configured based on the phase scrambling capability of tag device 120. LMF 131 may transmit tag configuration 390 to tag device 120, one or more TRPs, or a combination thereof.

LMF 131 may generate TRP configuration 372. In some implementations, LMF 131 may generate TRP configuration 372 based on tag device indicator 370, the tag capability of tag device 120, tag configuration 390, or a combination thereof. TRP configuration 372 may indicate a designation of one or more TRPs as a Tx TRP, one or more TRPs as an Rx TRP, or a combination thereof. Additionally, or alternatively, TRP configuration 372 may include PRS configuration 381 and MG configuration 382. PRS configuration 381 may include or indicate information, such as PRS information 307, for one or more TRPs designated as the Tx TRP to transmit a PRS, such as positioning reference signal 374. In some implementations, PRS configuration 381 includes or indicates a frequency shifting parameter, a phase scrambling parameter, or a combination thereof. Additionally, or alternatively, PRS configuration 381 may include or indicate a backscatter frequency offset value of backscatter signal 376, a waveform corresponding to PRS 374, a bandwidth corresponding to PRS 374, a sequence type corresponding to PRS 374 (e.g., a m-sequence, a ZC sequence), a sequence length corresponding to PRS 374, or a combination thereof. MG configuration 382 may include or indicate information, such as measurement gap information 308, for one or more TRPs designated as the Rx TRP to receive positioning reference signal 374, backscatter signal 376, or a combination there.

LMF 131 may transmit TRP configuration 372 to one or more TRPs, such as TRPs 340-348. The one or more TRPs may receive TRP configuration 372 and determine that first TRP 340 is designated as a Tx TRP and second through fourth TRPs 342-348 are designated as Rx TRPs. Additionally, or alternatively, the one or more TRPs may receive TRP configuration 372 and update information 306, such as PRS information 307 and measurement gap information 308, based on TRP configuration 372.

First TRP 340 may transmit PRS 374 based on or according to PRS information 307 (e.g., PRS configuration 381). PRS 374 may be received by tag device 120 and one or more TRPs of TRPs 342-348.

Tag device 120 may receive PRS 374 and transmit backscatter signal 376 based on PRS 374. For example, tag device 120 may reflect PRS 374 to generate backscatter signal 376. Tag device 120 may generate backscatter signal 376 in accordance with frequency shifting parameter, phase scrambling parameter, or a combination thereof. Accordingly, backscatter signal 376 may be frequency shifted, phase scrambled, or both as described further herein at least with reference to FIG. 4.

Backscatter signal 376 may be received by one or more TRPs of TRPs 340-348. In some implementations, the one or more TRPs of TRPs 340-348 may receive backscatter signal 376 during a time period indicated by MG configuration 382 (e.g., measurement gap information 308). The one or more TRPs of TRPs 340-348 that receive backscatter signal 376 may generate measurement report 378. For example, second TRP 342 may generate measurement report 378 and transmit measurement report 378. As another example, first TRP 340 may receive backscatter signal 376 and generate a measurement report (e.g., 378) based on measurement information 310. It is noted that, backscatter signal 376 received by Rx TRPs 342-348 may include components attributable to interference, such as from an environment proximate to tag device 120. Accordingly, the Rx TRPs 342-348 may perform operations, as described further herein with reference to FIGS. 4-6, to isolate backscatter signal 376 from components attributable to interference.

LMF 131 receives on or more measurement reports (e.g., 378) and determine a position of tag device 120 based on data included in measurement report 378. Measurement report 378 may indicates a channel condition experienced by TRPs 340-348, an interference experienced by TRPs 340-348, an interference associated with backscatter signal 376 (e.g., interference due to an environment proximate to tag device 120), or a combination thereof. In some implementations, LMF 131 may generate tag configuration 390 based on measurement report 378.

In some circumstances, identifying a position of a tag device 120 may be time critical. In such a cases, tag device 120 may indicate an energy level of tag device 120 to LMF 131. In some implementations, tag device indicator 370 may indicate the energy level of tag device 120. If the energy level is less than or equal to a threshold, or is not high enough to support a number of backscattering repetitions, and the position is time critical, LMF 131 may initiate on demand energy harvesting. For example, LMF 131 may use PRS configuration 381 to indicate that PRS 374 is to be transmitted to enable tag device 120 to harvest energy. Alternatively, if the positioning is not time critical or if the energy level is greater than the threshold, LMF 131 may indicate that regular energy harvesting signal may be provided.

In some implementations, tag device 120 provides LMF 131 with a current energy level of tag device 120. If the energy level is insufficient for a number of, for example, backscattering repetitions, TRPs 340-348 may choose between providing on demand energy harvesting, if positioning is time critical, or if positioning is not time critical, then TRPs 340-348 may periodically provide energy harvesting operations.

In some implementations, use of more than one Tx TRP may facilitate determination of a direction and a velocity of moving tag device 120 by LMF 131. For example, two or more TRPs 340-348 may be designated as Tx TRPs via TRP configuration 372.

In some implementations, LMF 131 may be configured to calculate or may configure other devices, such as one or more TRPs 340-348 to calculate, a power level of PRS 374 and a power level of backscatter signal 376. Thereafter, a ratio of the power level of backscatter signal 376 to the power level of PRS 374 may be determined. If the ratio is less than or equal to a threshold, indicating that backscatter signal 376 is attenuated, then LMF 131 may configure PRS 374, via PRS configuration 381, to operate on certain frequencies of the available bandwidth. Conversely, if the ratio satisfies the threshold, LMF 131 may configure TRPs 340-348, via PRS configuration 381, to generate and transmit PRS 374 over an entire available PRS bandwidth. Additionally, or alternatively, LMF 131 may be configured to select a positioning methodology, such as one of TOA, TDOA, or AOA, that LMF 131 identifies to be most likely to accurately and precisely identify a position of tag device 120. LMF 131 may select the positioning methodology based on tag device indicator 370, a tag capability, a TRP capability, network topology, environmental information (e.g., known structures or position of one or more devices), or a combination thereof, as illustrate, non-limiting examples.

As described with reference to FIG. 3, the present disclosure provides techniques for supporting backscatter-based positioning. The techniques described facilitate determining a position, such as a two dimensional or a three dimensional position, of a tag device, such as tag device 120, that has limited on-board power and computational resources (e.g., a passive or semi-passive tag). To illustrate, LMF 131 is able to provide TRP configuration 372 (e.g., PRS configuration 381) to one or more TRPs, such as TRPS 340-348, that accounts for particular characteristics of the tag device, such as limited on-board power or computational resources of the tag device. Additionally, LMF 131 is able to determine a position of tag device 120 based on one or more measurement reports 378. In some implementations, the techniques described enable tag device 120 to frequency shift backscatter signal 376. Frequency shifting backscatter signal 376 may remove or avoid interference from backscatter signal 376 attributable to factors such as self-interference (of a Tx TRP), interference attributable to signals other than backscatter signal 376 reflected by an environment proximate to tag device 120 (e.g., from the ground, other objects proximate to tag device 120, etc.), or a combination thereof. In some implementations, the techniques described enable tag device 120 to phase scrambling backscatter signal 376 so that Rx TRPs 342-348 may more readily distinguish reflected backscatter signal 376 from interference based on the phrase scrambling sequence modulated onto backscatter signal 376.

Figure 4:
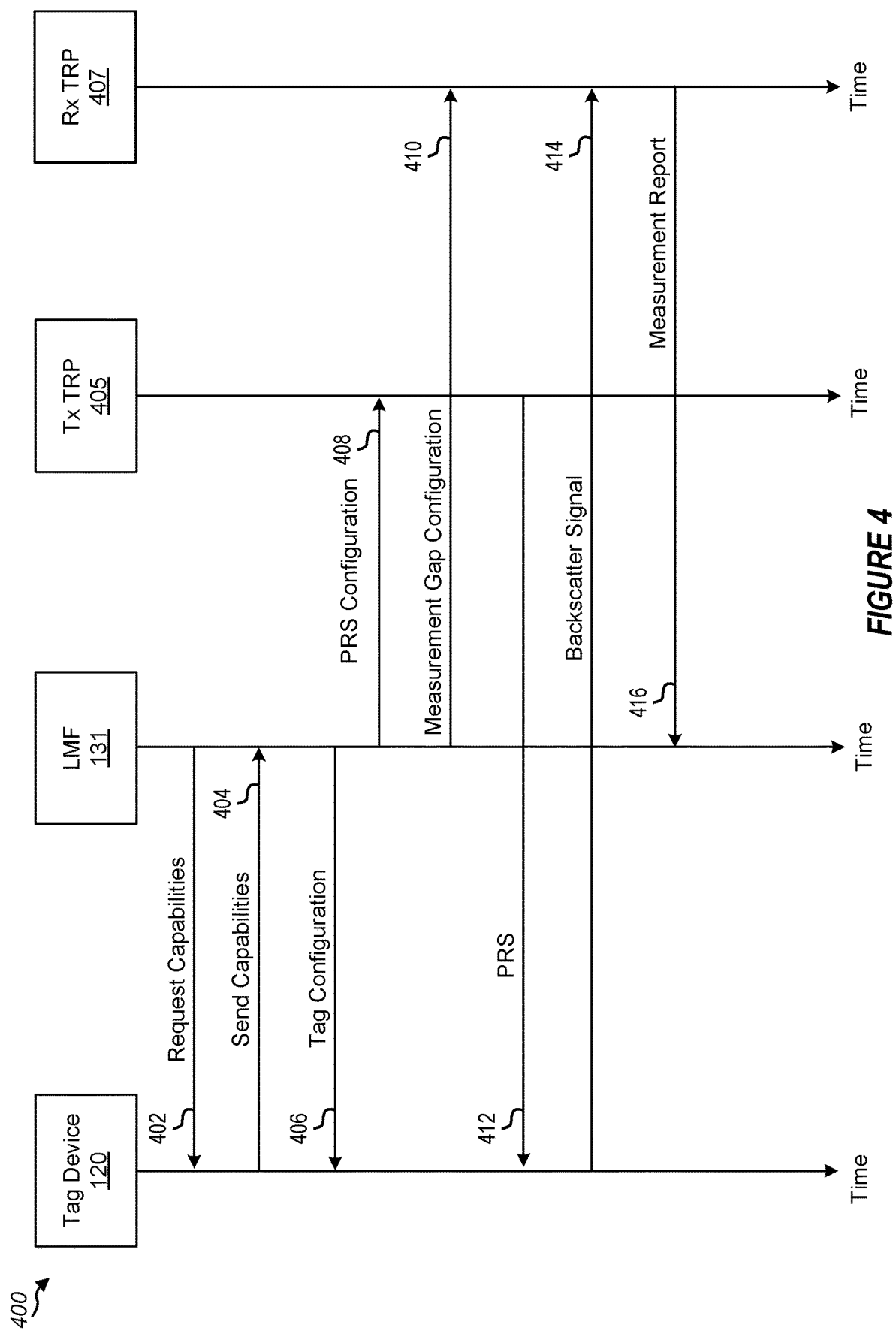
FIG. 4 is a ladder diagram illustrating an example of backscatter-based positioning according to one or more aspects.

FIG. 4 is ladder diagram illustrating an example of backscatter based positioning according to aspects of the present disclosure. As shown in FIG. 4, system 400 of the ladder diagram of FIG. 4 includes tag device 120, LMF 131, a Tx TRP 405, and an Rx TRP 407. Tx TRP 405 and Rx TRP 407 may include or correspond to TRP 340, 342, 346, or 348. Tag device 120, LMF 131, Tx TRP 405, and Rx TRP 407 may include one or more components and be configured to perform one or more operations, as described with reference to FIGS. 1-3. System 400 may include or correspond to wireless communication system 100 or 300. While FIG. 4 depicts singular Tx TRP 405 and Rx TRP 407, a system may include more than one Tx TRP, more than one Rx TRP, or a combination thereof.

Referring to FIG. 4, during operation of system 400, at 402, LMF 131 transmits a request for one or more tag capabilities to tag device 120. At 404, tag device 120 transmits the one or more tag capabilities. For example, the one or more tag capabilities may include or correspond to tag device indicator 370. The one or more tag capabilities may be received by LMF 131.

In some implementations, the one or more tag capabilities includes a tag type, a bandwidth, a positioning reference signal slot periodicity, a sensitivity, a tag delay, an energy harvesting capability, or a combination thereof. The tag type may include or indicate a passive tag, a semi-passive tag, or an active tag.

Additionally, or alternatively, the tag capabilities may include or correspond to a frequency shifting capability of tag device 120, a phase scrambling capability of tag device 120, or a combination thereof. For example, the frequency shifting capability may include a bandwidth of backscatter signal 376, a frequency shift waveform configurable by tag device 120, a time delay associated with switching a frequency of backscatter signal 376, an amount of time during which tag device 120 is configurable to perform frequency shifting operations, a power level available, at tag device, for performing a frequency shifting operation, or a combination thereof.

A frequency shift configurable by tag device 120 may include a single sided frequency shift, a double-sided frequency shift, a double-sided frequency shift with a ninety degree phase shift, a square waveform, or other waveform type. To illustrate, mathematically, backscatter signal 376 may be described at b(t)=b [frequency shift waveform], where b may represent an amplitude value of backscatter signal 376 and the frequency shift waveform may include or correspond to any of the following:

$e^{j\pi f_b t}$ for a single sided frequency shift, where $f_p$ corresponds to a shifted frequency value;

bcos($2\pi f_p t$) for a double-sided frequency shift;

bsin($2\pi f_b t$) for a double-sided frequency shift with a ninety degree phase shift; or brect(t−k/$f_b$) for a square waveform frequency shift, where k is scaling factor corresponding to the shifted frequency value.

While the foregoing are examples of possible frequency shift waveforms corresponding to a frequency shifted backscatter signal 376, tag device 120 may be configurable to produce other or different frequency shift waveforms than the foregoing waveforms.

The phase scrambling capability may include or indicate supported phase values of tag device 120, a scaling factor value selectable by tag device 120, an amount of time during which a phase scattering operation is performable at or by tag device 120, an amount of power available to tag device 120 to perform the phase scattering operation, or a combination thereof. For example, supported phase values of tag device 120 may include or correspond to values such as {π, −π} or {π/2, −π2, π, −π}. Scaling factor values selectable by tag device 120 may include fixed values, tunable values, or both, and the values may be integer values or rational values.

At 406, LMF 131 transmits tag configuration 390 to tag device 120. LMF 131 may generate tag configuration 390 associated with transmission of backscatter signal 376 based on positioning reference signal (PRS) 374. Tag configuration 390 may indicate a parameter of a backscatter signal (e.g., 376) generated based on PRS 374. To illustrate, the parameter may include a frequency of the backscatter signal, a number of repetitions of the backscatter signal, a time period during which the backscatter signal is to be transmitted, or a combination thereof. In some implementations, tag configuration 390 includes a frequency shifting parameter based on a frequency shifting capability of tag device 120, a phase scrambling parameter based on a phase scrambling capability of tag device 120, or both.

LMF 131 may configure the frequency shifting parameter based on the frequency shifting capability of tag device 120, an interference experienced at a TRP (e.g., TRPs 340-348) based on data included in a measurement report, or a combination thereof. Moreover, the frequency shifting parameter may include a backscatter frequency offset value of the backscatter signal (denoted $f_b$), an indication of frequency shift waveform (e.g., whether the frequency shift waveform corresponds to a single sided frequency shift, a double-sided frequency shift, a double-sided frequency shift with a ninety degree phase shift, a square waveform, etc.), a timeframe during which a frequency shifting operation is to be performed, or a combination thereof. In some implementations, the backscatter frequency offset value of the backscatter signal may be a fixed value (e.g., $f_b$<200 kHz, or $f_b$ can be 100 MHz), a tunable value selectable from a bandwidth allocable to backscatter signal 376, a tunable value selectable from a specified range of frequency values (e.g., any value less than 20 MHz), or a combination thereof.

LMF 131 may configure the phase scrambling parameter based on the phase scrambling capability of tag device 120, an interference experienced at a TRP (e.g., TRPs 340-348) based on data included in measurement report 378, or a combination thereof. In some implementations, phase scrambling parameter includes a scaling factor, a phase sequence with phase shifts, a length of the phase sequence, or a combination thereof. For example, LMF 131 may select any of the foregoing (e.g., a scaling factor, a phase sequence with phase shifts, a length of the phase sequence) as phase scrambling parameters.

At 408, LMF 131 transmits a PRS configuration to Tx TRP 405. For example, the PRS configuration may include or correspond to PRS configuration 381. In implementations, the PRS configuration may be included in a TRP configuration, such as TRP configuration 372. The PRS configuration may indicate a repetition of the PRS, a bandwidth configuration, a comb pattern configuration, or a combination thereof.

Additionally, or alternatively, the PRS configuration may include the frequency shifting parameter, the phase scrambling parameter, a PRS time offset value, or a combination thereof. The PRS time offset value may be derived based on the frequency shifting parameter. In some implementations, the PRS configuration may configure a PRS to include features to enhance separation of a PRS from a backscatter signal. For example, PRS may be selected to have a sequence (e.g., a m-sequence, a ZC sequence) to enhance separation of PRS from a received backscatter signal. It is noted that when system 400 includes multiple Tx TRPs, each Tx TRP of the multiple Tx TRPs may receive a PRS configuration, such as the same PRS configuration or different PRS configurations.

At 410, LMF 131 transmits a measurement gap configuration to Rx TRP 407. The measurement gap configuration indicates a time period during which each Rx TRP of a plurality of TRPs refrains from transmitting. For example, the measurement gap configuration may include or correspond to MG configuration 382. In an implementation, the measurement gap configuration may be included in a TRP configuration, such as TRP configuration 372.

At 412, Tx TRP 405 transmits a PRS to tag device 120. For example, the PRS may include or correspond to positioning reference signal 374. The PRS may be configured in accordance with the PRS configuration, such as PRS configuration 381.

At 414, tag device 120 transmits a backscatter signal in response to the PRS. For example, tag device 120 may reflect the PRS to generate the backscatter signal. The backscatter signal may include or correspond to backscatter signal 376. The back scatter signal may be received by one or more Rx TRPs, such as Rx TRP 407. In some implementations, Rx TRP 407 may receive the backscatter signal during the time period indicated by the measurement gap configuration. In some implementations, backscatter signal may be frequency shifted based on the frequency shift parameter, phase scrambled based on the phase scrambling parameter, or both. To illustrate, tag device 120 may generate a reflected backscatter signal based on the frequency shift parameter, the phase scrambled parameter, or both. For instance, based on the frequency shift parameter, tag device 120 may manipulate or change a value of a frequency of the backscatter signal, a waveform of the backscatter signal, or both. As another example, tag device may manipulate or change a phase of the backscatter signal by imposing a phase shift or may apply a scaling factor so that the backscatter signal may be distinguished from the interference.

In some implementations, tag device 120 may adjust a phase of the backscatter signal by adjusting a load impedance of one or more antennas of tag device 120. To illustrate, a reflection coefficient associated with tag device 120, may be designated as $$\Gamma = \frac{Z_L - Z_A^*}{Z_L - Z_A} = |\Gamma|e^{j\phi},$$

where $Z_A$ is the impedance of antenna and $Z_L$ is the impedance of the load. $Z_A$ and $Z_L$ are complex values. Tag device 120 may be configured to select different loads (e.g., a different value for $Z_L$) from a set $\{|\Gamma|e^{j\phi 1}, \ldots, |\Gamma|e^{j\phi M-1}\}$. In the foregoing set, the amplitudes are the same; however, the phases are different. Tag device 120 may be configured to apply the foregoing phase shift to a backscatter signal to generate a phase scrambled backscatter signal to distinguish the phase scrambled backscatter signal from interference.

In some implementations, after Tx TRP 405 transmits PRS 374, Rx TRP 407, may receive a frequency shifted signal that, mathematically, may be modelled as $r(t)=h_c c(t) + bh_b c(t-t_c)$(frequency shift waveform)$+\Sigma_i h_i c(t-t_i)$. In the foregoing, r(t) nay include or correspond to a signal received at Rx TRP 407; $h_c c(t)$ may include or correspond to self-interference attributable to PRS 374, c(t); $bh_b c(t-t_c)$(frequency shifted waveform) may include or correspond to frequency shifted backscatter signal modulated onto PRS 374 with a backscatter coefficient, $h_b$; and $\Sigma_i h_i c(t-t_i)$ may include or correspond to interference from environmental sources, such as objects proximate to tag device 120. Frequency shift waveform may include any of $e^{j(2\pi f_b t + \phi)}$ for a single sided frequency shift, where $f_b$ corresponds to a shifted frequency value; $b\cos(2\pi f_b t + \phi)$ for a double-sided frequency shift; $b\sin(2\pi f_b t + \phi)$ for a double-sided frequency shift with a ninety degree phase shift; and $b\text{rect}(t-k/f_b)$, for a square wave frequency shift waveform, where $\phi$ corresponds to an unknown phase offset. The backscatter coefficient, $h_p$, may depend upon factors such as a backscatter efficiency of tag device 120 and pathloss of reflected backscatter signal 376. As a specific example involving frequency shifting using a single sided frequency shift, $r(t)=h_c c(t)+bh_b c(t-t_c) \times e^{j(2\pi f_b t + \phi)}+\Sigma_i h_i c(t-t_i)$.

In some implementations, a PRS time offset, $t_c$, may be estimated when a shifted frequency value $f_p$ is known (e.g., is included in a frequency shift parameter), a PRS waveform corresponding to PRS 374 (e.g., c(t)) is known, but other factors are unknown. These unknown factors may include number of direct reflectors with unknown reflection coefficient and self-interference component, unknown phase offset $\phi$, and unknown backscatter coefficient $h_p$. By estimating a PRS time offset, $t_c$, it may be possible to more accurately and precisely extract interference from backscatter signal 376.

In some implementations, Rx TRP 407, Tx TRP 405, LMF 131, or any of the foregoing may be configured to perform a procedure for identifying the PRS time offset, $t_c$. This procedure may include removing the frequency offset by multiplying the frequency shift waveform by its inverse. For example, when $r(t)=h_c c(t)+bh_b c(t-t_c) \times e^{j(2\pi f b t + \phi)} + \Sigma_i h_i c(t-t_i)$, frequency shift waveform $e^{j(2\pi f b t + \phi)}$ may be removed through multiplication by $e^{-(2\pi f b t)}$, leaving $r(t)=h_c c(t)e^{-j2\pi f b t}+bh_b c(t-t_c)e^{j\phi}+\Sigma_i h_i c(t-t_i)e^{-j2\pi f b t}$. Thereafter, the received signal, r(t), may be passed through a low pass filter to remove higher frequency harmonics, such as $h_c c(t)e^{-j2\pi f b t}$ and $\Sigma_i h_i c(t-t_i)e^{-j2\pi f b t}$, leaving $r(t)=bh_b c(t-t_c)e^{j\phi}$. In some implementations, backscatter frequency offset value of the backscatter signal (denoted $f_b$) may be selected to be sufficiently large that the frequency offset backscatter signal is easily removable by the low pass filter. Subsequently, PRS 374, c(t), may be correlated with randomly selected PRS time offsets to identify an appropriate PRS time offset, $t_c$.

In some implementations, after Tx TRP 405 transmits PRS 374, Rx TRP 407, may receive a phase scrambled signal that, mathematically, may be modelled as $r(t)=h_c c(t)+h_b c(t-t_c)b(t-t_b)+\Sigma_i h_i c(t-t_i)$. The terms $h_c c(t)$, $h_b c(t-t_c)$, and $\Sigma_i h_i c(t-t_i)$ are as explained above in the context of a frequency shifted signal. The term $b(t-t_b)$ may include or correspond to a backscatter signal having a backscatter signal time offset value, $t_b$. Of the foregoing components constituting r(t), $h_b c(t-t_c)b(t-t_b)$, which represents the PRS modulated with the backscatter signal, is phase scrambled. The other components comprising r(t) are not phase scrambled. Therefore, a TRP, such as Rx TRP 407, LMF 131, another device, or a combination thereof may be configured to detect $h_b c(t-t_c)b(t-t_b)$.

In some implementations, Rx TRP 407, LMF 131, another device, or a combination thereof may be configured to detect $h_b c(t-t_c)b(t-t_b)$ by applying a two-step process. In a first step, r(t) may be descrambled by determining a correct backscatter signal time offset value, $t_b$, and estimated backscatter signal time offset value $t_b'$ such that $b(t-t_b)b(t-t_b')=1$. In this manner, by selecting appropriate values of $t_b$ and $t_b'$, $r(t)=h_c c(t)b*(t-t_b)+h_b c(t-t_c)b(t-t_b)b*(t-t_b)+\Sigma_i h_i c(t-t_i) b*(t-t_i)$ corresponding to descrambled r(t), may conflate to $r(t)=h_c c(t)b*(t-t_b)+h_b c(t-t_c)+\Sigma_i h_i c(t-t_i) b*(t-t_b)$. In a second step, Rx TRP 407, LMF 131, another device, or a combination thereof may cross correlate $c(t-t_c)$ and $b(t-t_b)$ using a candidate value of $t_c$ (e.g., a randomly selected values of $t_c$) corresponding to the PRS time offset value. In particular, Rx TRP 407, LMF 131, another device, or a combination thereof may select the PRS time offset value, $t_c$, to satisfy the following decorrelation condition: $\Sigma r(t)c*(t-t')b*(t-t_b)=h \times \delta (t_c-t_c', t_b-t_b')$.

At 416, Rx TRP 407 transmits a measurement report to LMF 131. For example, the measurement report may include or correspond to measurement report 378. Rx TRP 407 may generate the measurement report based on the received backscatter signal. In some implementations, Rx TRP 407 may transmit the measurement report after expiration of the time period indicated by the measurement gap configuration. Additionally, or alternatively, Tx TRP 405 may also receive the backscatter signal and generate a measurement report based on the Tx TRP 405, that is then transmitted to LMF 131. In some implementations, the measurement report may include or indicate a type and a magnitude of interference in a backscatter signal received from tag device 120 in response to transmission of the PRS.

In some implementations, LMF 131 may receive one or more measurement reports from Tx TRP 405, Rx TRP 407, or another TRP. Based on the one or more measurement reports, LMF 131 may determine a position of tag device 120. For example, to determine the position of tag device 120, LMF 131 may calculate, based on the one or more measurement reports, a time of arrival (TOA), a time difference of arrival (TDOA), an angle of arrival (AoA), or a combination thereof.

Figure 5:
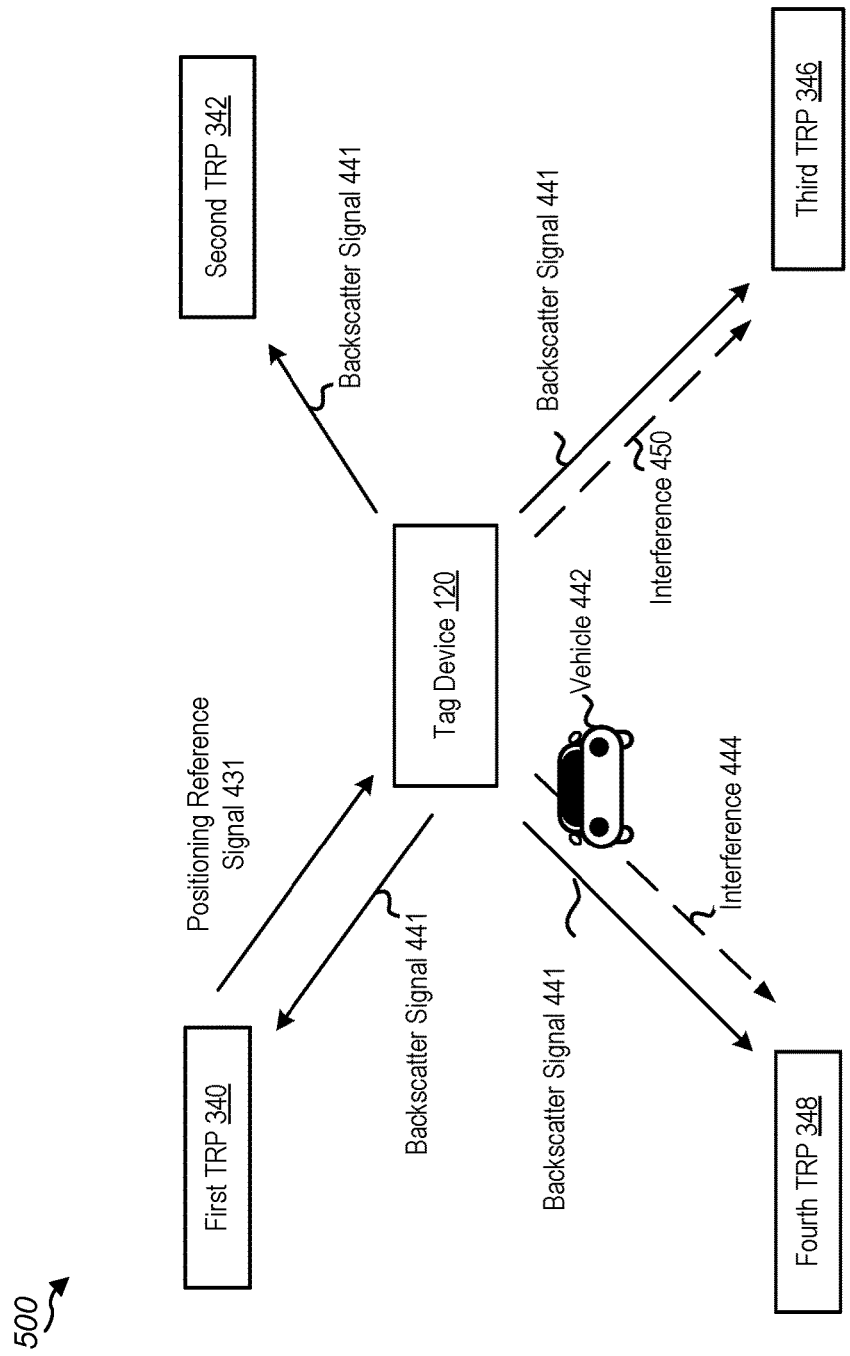
FIG. 5 is a block diagram illustrating an example wireless communication system that supports backscatter-based positioning according to one or more aspects.

Referring to FIG. 5, an example wireless communication system that supports backscatter-based positioning according to one or more aspects is depicted. The example wireless communication system 500 includes TRPs 340-348 and tag device 120. Wireless communication system 500 may include or correspond to wireless communication system 100, 300, or 400. During operation, first TRP 340 may transmit PRS 431 to tag device 120, and tag device 120 may reflect backscatter signal 441 to TRPs 340-348. TRPs 342-348 also may receive PRS 431.

Backscatter-based positioning may involve at least one Tx TRP (e.g., TRP 340), that performs the functions of a reader, a tag device (e.g., a RFID tag such as tag device 120), a position of which is to be determined through application of backscatter-based positioning, and a multiple Rx TRPs (e.g., TRPs 342-348). Estimates of a position of tag device 120 are obtained by measuring a round trip time (RTT) which is the sum of a first amount of time for PRS 374 to propagate from a Tx TRP, such as TRP 340, to tag device 120, a second amount of time for backscatter signal 441 to be reflected from tag device 120 to one or more TRPs (e.g., TRPs 340-348), and third amount of time indicating the tag delay. Tag delay corresponds to an amount of time that elapses for tag device 120 to process a received PRS and reflect the PRS as a backscatter signal. The first amount of time for PRS 431 to propagate from a Tx TRP (e.g., TRP 340) to tag device 120 may be denoted as $\tau_{TRP\_1 \to Tag\ Device}$. The second amount of time for backscatter signal 441 to be reflected from tag device 120 to one or more TRPs (e.g., TRPs 340-348) may be denoted as $\tau_{Tag\ Device \to TRP\_x}$, where the value of x denotes first TRP 340 (x=1), second TRP 342 (x=2), third TRP 346 (x=3), and fourth TRP 348 (x=4). The third amount of time attributable to tag delay may be denoted as $\tau_{Tag\ Delay}$. For example, the amount of time for backscatter signal 441 to be reflected by tag device 120 to second TRP 342 may be denoted $\tau_{Tag\ Device \to TRP\_2}$, while the amount of time for backscatter signal 441 to be reflected by tag device 120 to fourth TRP 348 may be denoted as $\tau_{Tag\ Device \to TRP\_4}$. Accordingly, using the assumption that $\tau_{TRP\_1 \to Tag\ Device} = \tau_{Tag\ Device \to TRP\_1}$ and the equations below, a position of tag device 120 may be determined:

$$\tau_{TRP\_1} = \tau_{TRP\_1 \to Tag\ Device} + \tau_{Tag\ Device \to TRP1} + \tau_{Tag\ Delay},$$

$$\tau_{TRP\_2} = \tau_{TRP\_1 \to Tag\ Device} + \tau_{Tag\ Device \to TRP\_2} + \tau_{Tag\ Delay},$$

$$\tau_{TRP\_3} = \tau_{TRP\_1 \to Tag\ Device} + \tau_{Tag\ Device \to TRP3} + \tau_{Tag\ Delay},$$

and $$\tau_{TRP\_4} = \tau_{TRP\_1 \to Tag\ Device} + \tau_{Tag\ Device \to TRP\_4} + \tau_{Tag\ Delay}.$$

In particular, $\tau_{TRP\_1}$, $\tau_{TRP\_2}$, $\tau_{TRP\_3}$, and $\tau_{TRP\_4}$ are RTT values that are used in time of arrival (TOA), time difference of arrival (TDOA), and angle of arrival (AOA) positioning techniques to obtain a position of a tag device (e.g., 120). For example, to implement TOA positioning, one or more devices, depicted in FIG. 3, such as LMF 131 of core network 130, may be configured to perform the following TOA positioning calculation:

$$\tau_{Tag\ Device \to TRP\_1} = \frac{\tau_{TRP\_1}}{2}, \tau_{Tag\ Device \to TRP\_2}$$

$$= \tau_{TRP\_2} - \frac{\tau_{TRP\_1}}{2}, \tau_{Tag\ Device \to TRP\_2}$$

$$= \tau_{TRP\_2} - \frac{\tau_{TRP\_1}}{2}, \tau_{Tag\ Device \to TRP\_3}$$

$$= \tau_{TRP\_3} - \frac{\tau_{TRP\_1}}{2}, \tau_{Tag\ Device \to TRP\_4}$$

$$= \tau_{TRP\_4} - \frac{\tau_{TRP\_1}}{2}$$

Similarly, to implement TDOA positioning, one or more devices, depicted in FIG. 3, such as LMF 131 of core network 130, may be configured to perform the following TDOA positioning calculation:

$$\nabla \tau_{i,ref} = \tau_{Tag\ Device \to TRP_i} - \tau_{Tag\ Device \to TRP_{ref}},$$
$$= \tau_i - \tau_{ref}$$

in which $TRP_{ref}$ is a reference TRP and $TRP_1$ is another TRP.

In some implementations, one or more devices, such as LMF 131, may be configured to determine an AoA through use of data included in measurement reports, such as measurement report 378. To illustrate, TRPs 340-348 may include directional antenna arrays and may be configured to determine an angle from which one or more backscatter signals, such as backscatter signal 441, is received. TRPs 340-346 may include the angle of receipt of the one or more backscatter signals in measurement report 378 transmitted to LMF 131. LMF 131 may then determine a AoA based on the angle of receipt data included in the one or more measurement reports.

As depicted in FIG. 5, interference, such as interference 444 or 450, may affect an integrity of one or more backscatter signals. For instance, interference 444 may be caused by an object, such as vehicle 442, that is proximate to tag device 120. As another example interference 450 may be caused by the ground proximate to tag device 120. By affecting the backscatter signal, interference 444 or 450 may negatively affect readings at Rx TRPs 346 or 348. For instance, interference 444 or 450 may render detection of $\tau_{Tag\ Device \to TRP_3}$ and $\tau_{Tag\ Device \to TRP\_4}$ at Rx TRPs 346 and 348, respectively, difficult, thereby leading to $\tau_{TRP\_3}$ and $\tau_{TRP\_4}$ measurements that are inaccurate, imprecise, or both.

By imposing a frequency shift at one or more backscatter signals, such as frequency shifted backscatter signal, by phase scrambling one or more backscatter signals, such as phase scrambled backscatter signal, or both, the effects of interference 444 or 450 may be mitigated. To illustrate, frequency shifted backscatter signal 441 may be separated from interference 444, with the result that Rx TRP 348 will more readily detect frequency shifted backscatter signal 441 over interference 444. As another example, by including a phase scrambling pattern in phase scrambled backscatter signal 441, Rx TRP 346 may be configured to distinguish phase scrambled backscatter signal 441 over interference 450 by searching for the phase scrambled pattern imposed on phase scrambled backscatter signal 441.

Figure 6:
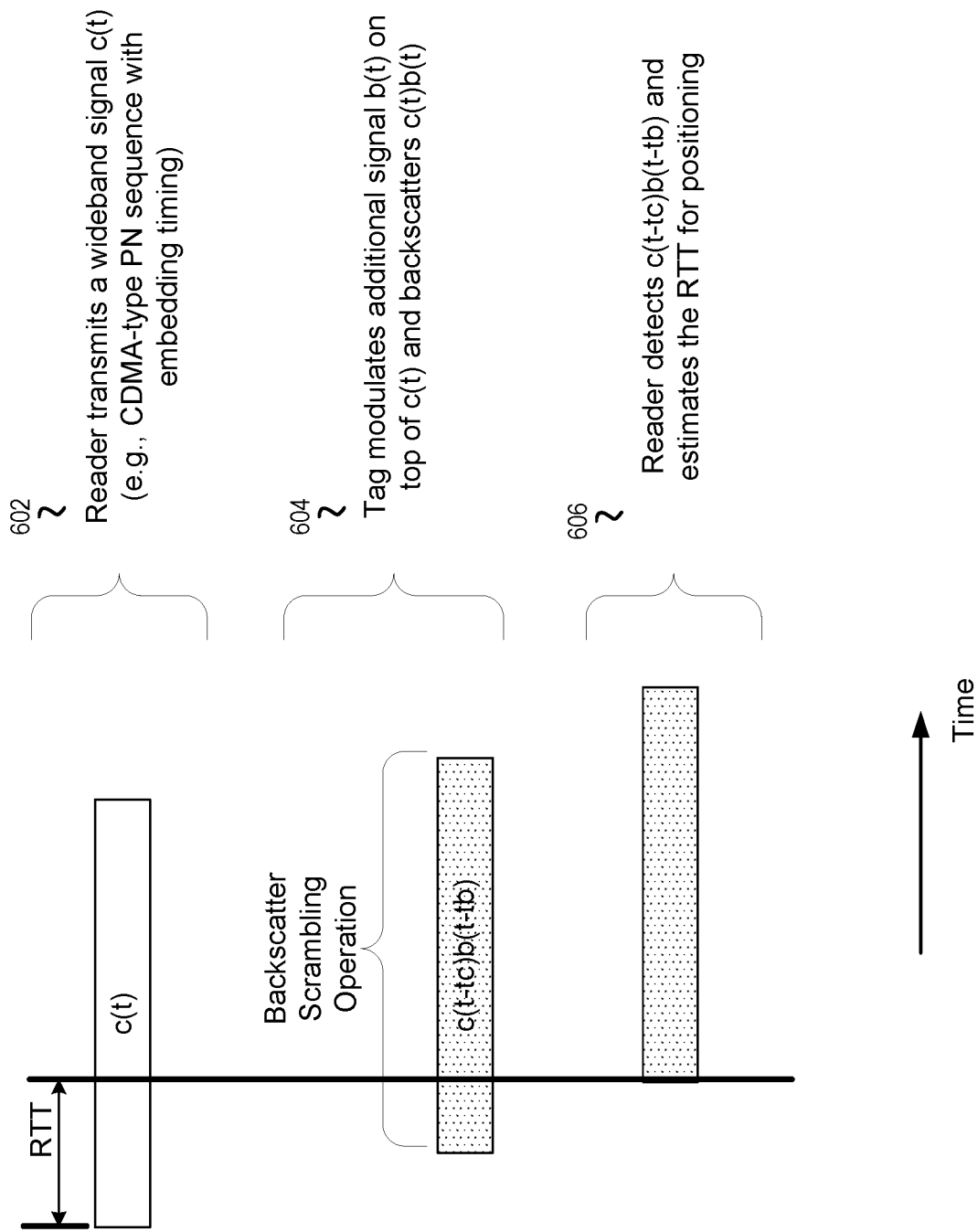
FIG. 6 is a conceptual diagram that supports backscatter-based positioning according to one or more aspects.

FIG. 6 is a conceptual diagram that supports backscatter-based positioning according to one or more aspects. At 602, one or more Tx TRPs, such as TRPs 340-348, may be configured to transmit a PRS, such as PRS 374, that might include or correspond to a wideband signal c(t). For example, c(t) may a code-division multiple access-pseudo random (CDMA-PN) signal with chip-rate equal to a frequency of the Tx TRP, denoted $f_{TxTRp}$. In some implementations, c(t) may be selected to have robust auto-correlation with c(t−$t_c$), corresponding to a time shifted component of PRS that may be included in backscatter signal received at a Rx TRP.

At 604, a tag device, such as tag device 120, may be configured to modulated signal b(t) on top of PRS, c(t), and may reflect combined c(t)b(t) as the backscatter signal to one or more Rx TRPs, such as Rx TRPs 342-348. In some implementations, backscatter signal may be frequency shifted, such that the backscatter signal (e.g., backscatter signal 376), mathematically at tag device 120, corresponds to c(t−$t_c$)b(frequency shifted signal). As an example, frequency shifted signal may correspond to $e^{j(2\pi f_b t+\phi)}$ when frequency shift parameter includes a frequency shift waveform $e^{j(2\pi f_b t+\phi)}$ with a backscatter frequency offset value $f_b$. In some implementations, backscatter signal may be phase scrambled, such that the backscatter signal (e.g., backscatter signal 376), mathematically at tag device 120, corresponds to $h_b c(t-t_c)b(t-t_b)$, where $t_c$ corresponds to a PRS time offset value and $t_b$ corresponds to a backscatter signal time offset value. As a further example, in generating a phase scrambled backscatter signal, tag device 120 may be configured to convert a frequency of the backscatter signal to the following: $f_{tag\ device}=f_{TRP}/K$, where K is a scaling factor included in as phase scrambling parameter.

At 606, a Rx TRP (e.g., Rx TRPs 342-348) receives a the backscatter signal. Since the received backscatter signal has been contaminated with interference, the received backscatter signal, at Rx TRP, mathematically may be represented as r(t)=$h_c c(t)+bh_b c(t-t_c)$ (frequency shift waveform)+$\Sigma_i h_i c(t-t_i)$ when the backscatter signal has been frequency shifted at tag device 120 and as r(t)=$h_c c(t)+h_b c(t-t_c)b(t-t_b)+\Sigma_i h_i c(t-t_i)$, when the backscatter signal has been phase scrambled.

Additionally at 606, a Rx TRP, a LMF, such as LMF 131, other device, or a combination thereof may perform operations on the received backscatter signal to extract, cancel, or negate interference in the received backscatter signal. In some implementations, in response to receiving a frequency shifted backscatter signal, the Rx TRP, the LMF, other device, or a combination thereof may remove one or more components of frequency shift parameter included in the received backscatter signal, apply a low pass filter to the backscatter signal to remove interference-related components of the received backscatter signal, and correlate PRS, c(t), with a time shifted component of PRS included in the received backscatter signal, c(t−$t_c$), by selecting an appropriate PRS time offset value, $t_c$.

In some implementations, in response to receiving a frequency shifted backscatter signal, the Rx TRP, the LMF, other device, or a combination thereof may remove one or more components of frequency shift parameter included in the received backscatter signal, apply a low pass filter to the backscatter signal to remove interference-related components of the received backscatter signal, and correlate transmitted PRS, c(t), with a time shifted component of PRS included in the received backscatter signal, c(t−$t_c$), by selecting an appropriate PRS time offset value, $t_c$.

In some implementations, in response to receiving a phase scrambled backscatter signal, the Rx TRP, the LMF, other device, or a combination thereof may remove one or more components of the received backscatter signal that have not been phase scrambled. For example, the Rx TRP, the LMF, other device, or a combination thereof may perform a double correlation by first correlating the received backscatter signal with b (t−$t_b$) with appropriate $t_b$, and then correlating transmitted PRs, c(t), with a time shifted component of PRS included in the received backscatter signal, C(t−$t_c$), by selecting an appropriate PRS time offset value, $t_c$.

Figure 7:
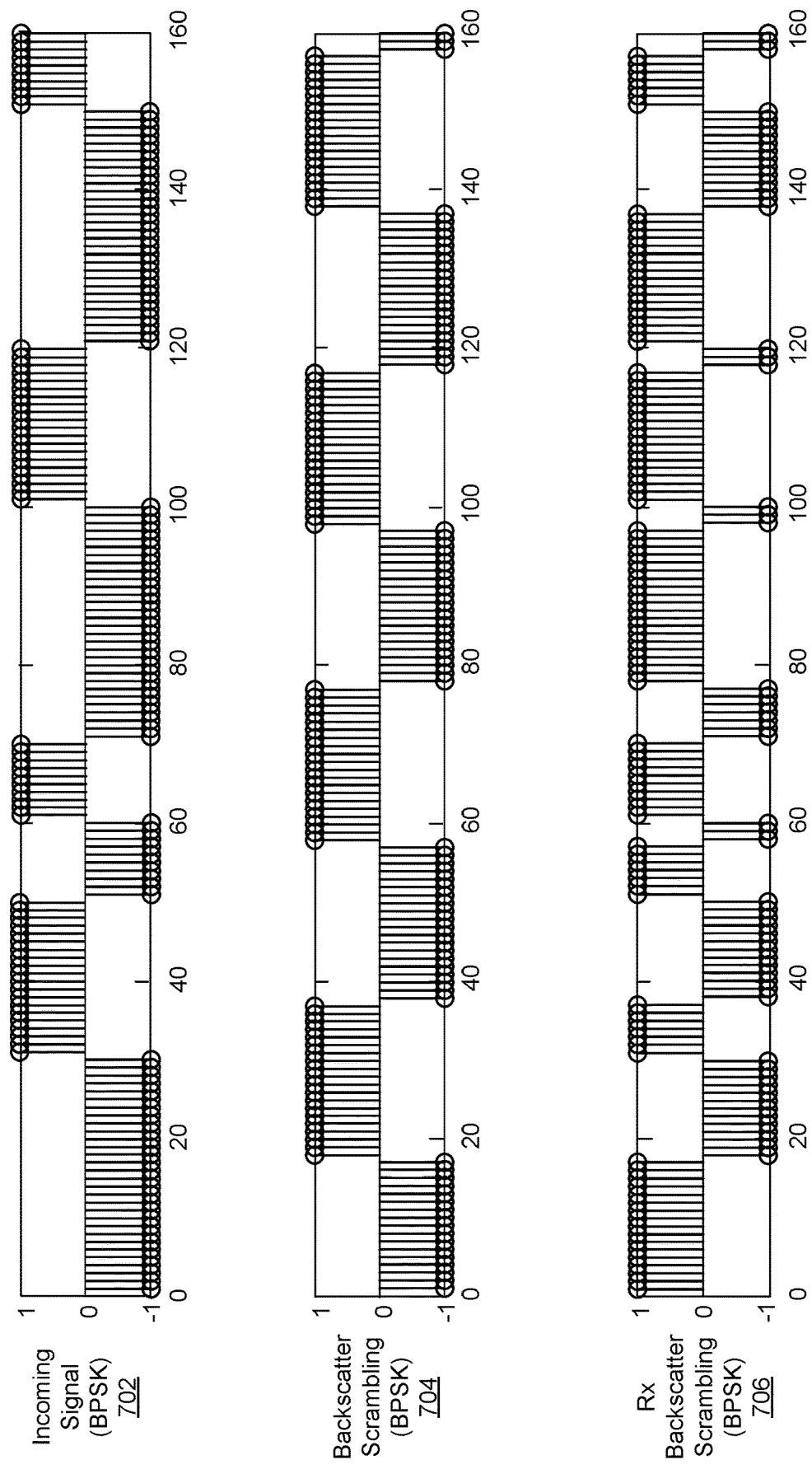
FIG. 7 is a conceptual diagram that depicts phase scrambling according to one or more aspects.

FIG. 7 is a conceptual diagram that depicts phase scrambling according to one or more aspects. At 702, a Tx TRP, such as TRP 340, transmits PRS, such as PRS 374, to a tag device, such as tag device 120. For example, the PRS may be a binary phase-shift keying (BPSK) signal as depicted in FIG. 7. Based on a phase scrambling parameter provided to the tag device, such as through a tag configuration (e.g., tag configuration 390), provided to the tag device, such as by a LMF (e.g., LMF 131), the tag device may be configured to generate a backscatter signal (e.g., backscatter signal 376) that is phase scrambled as depicted in FIG. 7. At 706, when received at a Rx TRP, such as one or more Rx TRPs 342-358, the received backscatter signal 706 may be manipulated through mathematical operations as explained above to result in the received backscatter signal depicted at 706.

Figure 8:
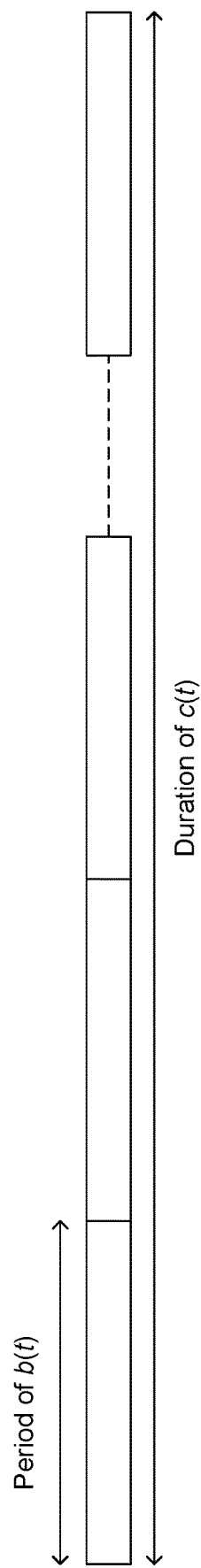
FIG. 8 is a conceptual diagram that supports backscatter-based positioning according to one or more aspects.

FIG. 8 is a conceptual diagram that supports backscatter-based positioning according to one or more aspects. In particular, FIG. 8 depicts that an LMF, such as LMF 131, generates a PRS configuration, such as PRS configuration 381, that configures PRS, c(t), (e.g., PRS 374) to have a duration. To enhance detection of the received backscatter signal, a modulation signal b(t) (e.g., a modulation sequence) is applied to the PRS to generate the backscatter signal. The sequence of c(t) may be longer than that of b(t).

Additionally, to enhance detection, at one or more Rx TRPs, of a backscatter signal received at the one or more Rx TRPs, LMF 131 may generate a tag configuration (e.g., tag configuration 390) that configures the tag device (e.g., tag device 120) to generate a backscatter signal satisfying the following properties when received at the one or more Rx TRPs:

$\Sigma r(t)c^*(t-t_c')b^*(t-t_b')$, if $t_c'=t_c$, but $t_b'\neq t_b$ (with some error), we have $h_c c(t)c^*(t-t_c)b^*(t-t_b')+h_b b(t-t_b)b^*(t-t_b')+\Sigma_i h_i c(t-t_i)c^*(t-t_c')b^*(t-t_b')$.

In some implementations b(t) is not required to have a good auto-correlation property and it can be assumed that $C(t-t_c)\times c^*(t-t_c)=1$.

However, in some situations, after scrambling of $b^*(t-t_b)$, the auto-correlation with c(t) does not provide high peaks. In such situations, b(t) may need a good randomization property (e.g., auto-correlation). Accordingly, in some implementations, b(t) has a periodic structure of period S and the duration of c(t) is longer than the period of b(t). The periodic structure may provide sufficient auto-correlation.

Figure 9:
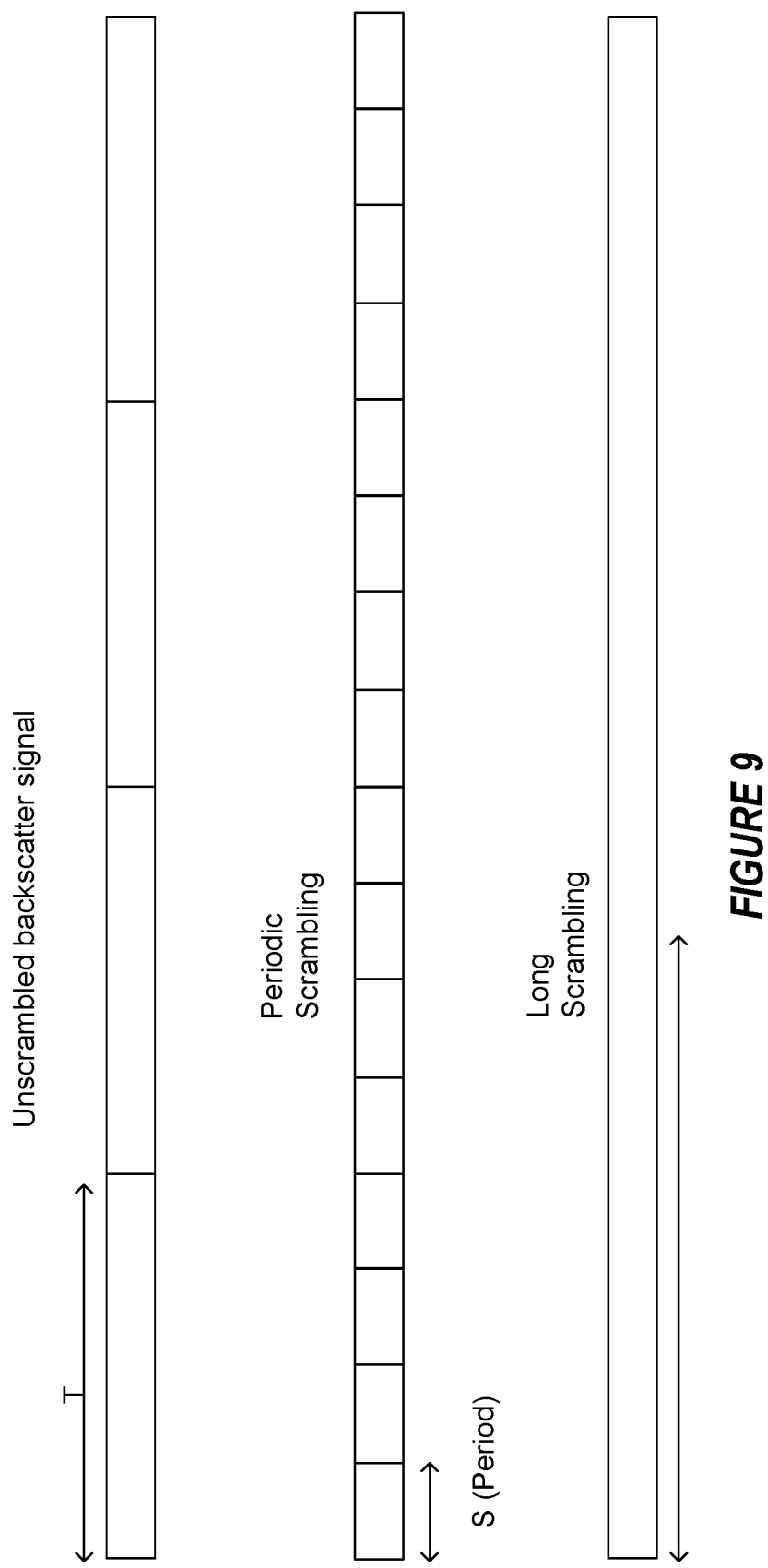
FIG. 9 is a conceptual diagram that supports backscatter-based positioning according to one or more aspects.

FIG. 9 is a conceptual diagram that supports backscatter-based positioning according to one or more aspects. In particular, FIG. 9 describes the concept of descrambling a scrambled backscatter signal received at one or more Rx TRPs in which the modulation signal, b(t), generated at the tag device, is periodic, and in which the Rx TRPs and tag device operate asynchronously. To effectuate this descrambling at the one or more Rx TRPs, a backscatter signal time offset value (e.g., $t_b$) is selected so that, when a time offset PRS component of the received backscatter signal, c(t−$t_c'$), is correlated with a time offset component of the tag-generated backscatter signal received at the one or more Rx TRPs, b(t−$t_b$'), the decorrelation satisfies the following property: $\Sigma r(t)c^*(t-t_c')b+(t-t_b')=h\times\delta(t_c-t_c', t_b-t_b')$, where $t_c'$ and $t_b'$ are, respectively, an estimated (e.g., experimental or hypothetical) PRS time offset value and a candidate backscatter signal time offset value.

To illustrate, the unscrambled backscatter signal may be considered to have one or more portions T. A modulation signal b(t) (e.g., a modulation sequence) may be applied using a short scrambling technique or a long scrambling technique. In the short scrambling technique, b(t) has a period S that is less than T. The long scrambling technique has a duration that is longer than T. To descramble a backscatter signal, a device may need to try multiple descramble attempts to identify $t_b$—e.g., to find a value that produces a "clean" descrambled outcome. In some implementations, the device may identify the period of the short scrambling technique based on the backscatter signal. As compared to the long scrambling technique, the short scrambling technique may reduce a number of attempts (e.g., a number of candidates) and effectively reduce an amount of descrambling that needs to be performed. For example, the number of candidates is reduced from a set of multiple possible candidates to a set of candidates within the period.

Figure 10:
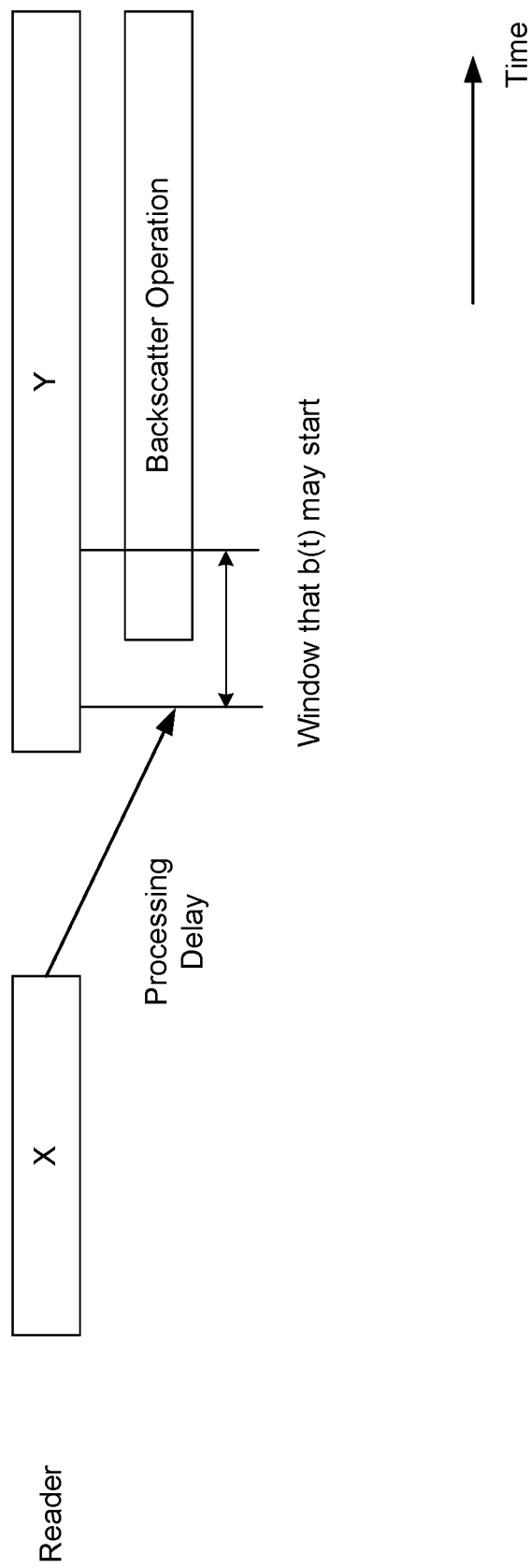
FIG. 10 is a conceptual diagram that supports backscatter-based positioning according to one or more aspects.

FIG. 10 is a conceptual diagram that supports backscatter-based positioning according to one or more aspects. In particular, FIG. 10 depicts that a reader, such as reader device 121, transmits a tag configuration X prior to transmission of a PRS Y. Tag configuration X and PRS Y may include or correspond to tag configuration 390 and PRS 374, respectively. Based on tag configuration X, a tag device, such as tag device 120, may configure one or more components of the tag device based on the tag configuration X. An amount of time corresponding to configuring the one or more components may be referred to as a processing delay. During the configuring of the one or more components, the tag device may not be able to modulate PRS Y. Once the one or more components are configured, the tag device may use a modulation signal b(t), which may start during a window as indicated in FIG. 10. It is noted that the window beings at or after an end of the processing delay.

Figure 11:
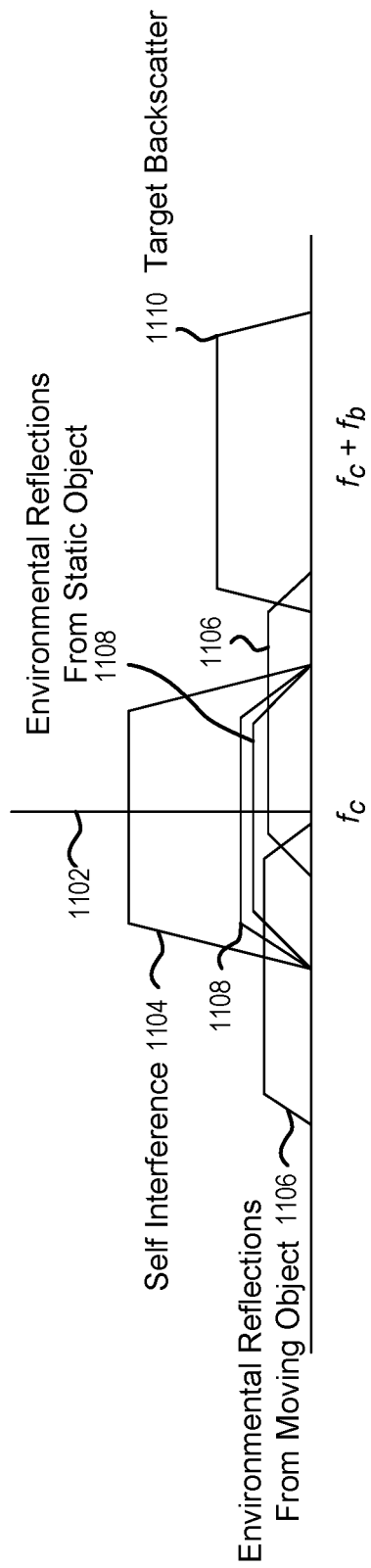
FIG. 11 is a conceptual diagram that supports backscatter-based positioning according to one or more aspects.

FIG. 11 is a conceptual diagram that supports backscatter-based positioning according to one or more aspects. In particular, FIG. 11 is a frequency-domain graph depicting the concept of frequency shifting. A non-frequency shifted backscatter signal may have a same frequency, fc, as PRS as depicted at 1102. Consequently, upon receipt at one or more Rx TRPs, the non-frequency shifted backscatter signal may include interference, from ambient sources, such as from self-interference 1104; interference attributable to moving objects proximate to the tag device, such as at 1106; and interference from other environmental sources, such as the ground proximate to the tag device, such as at 1108. Accordingly, a measurement report, such as measurement report 378, generated by a Rx TRP may include inaccurate or imprecise positioning data associated with the tag device, with the result that a position of the tag device may be incorrectly determined.

However, phase shifting the backscatter signal generated at the tag device by increasing a frequency of the backscatter signal by backscatter frequency offset value, $f_b$, shifts the received backscatter signal in the frequency domain at 1110, enhancing detection of the backscatter signal at the Rx TRP. To elaborate, based on a frequency shift parameter, a tag device may be configured to adding the backscatter frequency offset value, $f_b$, to a frequency of the PRS, fc, thereby shifting the frequency of the transmitted backscatter signal in the frequency domain. In this manner, even though interference 1104, 1106, 1108 may interfere with the backscatter signal received at the Rx TRP, the backscatter signal may be more readily identified by the Rx TRP.

Figure 12:
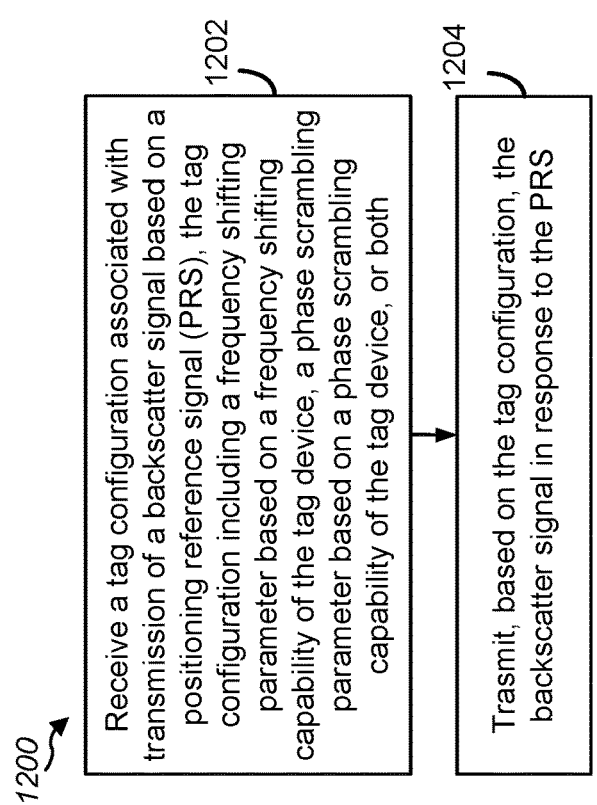
FIG. 12 is a flow diagram illustrating an example process that supports backscatter-based positioning according to one or more aspects.

FIG. 12 is a flow diagram illustrating an example process 1200 that supports backscatter-based positioning according to one or more aspects. Operations of process 1200 may be performed by a tag device, such as tag device 120 or a tag device described with reference to FIG. 13. For example, example operations (also referred to as "blocks") of process 1200 may enable the tag device to support backscatter-based positioning.

In block 1202, the tag device receives a tag configuration. For example, the tag configuration may include or correspond to tag configuration 390. The tag configuration includes a frequency shifting parameter based on a frequency shifting capability of the tag device, a phase scrambling parameter based on a phase scrambling capability of the tag device, or a combination thereof. In some implementations, the tag configuration may indicate the frequency shifting parameter and the phase scrambling parameter.

In some implementations, the tag device determines, based on the tag configuration, the frequency shifting parameter, the phase scrambling parameter, or a combination thereof. Additionally, or alternatively, the tag device may configure one or more components of the tag device based on the frequency shifting parameter, the phase scrambling parameter, or a combination thereof.

In block 1204, the tag device transmits, based on the tag configuration, a backscatter signal in response to a PRS. For example, the backscatter signal and the PRS may include or correspond to backscatter signal 376 and PRS 374.

In some implementations, the tag device receives the PRS from a TRP, such as a Tx TRP (e.g., first TRP 340). The PRS may be configured based on a PRS configuration, such as PRS configuration 381. Additionally, or alternatively, the tag device may generate the backscatter signal. The backscatter signal may be generated in accordance with the frequency shifting parameter, the phase shifting parameter, or a combination thereof.

In some implementations, the tag device transmits, to a network entity, a tag device indicator that indicates a tag capability of the tag device. For example, the network entity may include or correspond to core network 130, LMF 131, TRP 340, 342, 346, 348, 405, or 407. The tag device indicator may include or correspond to tag device indicator 370. The tag capability may include the frequency shifting capability, the phase scrambling capability, or both.

Figure 13:
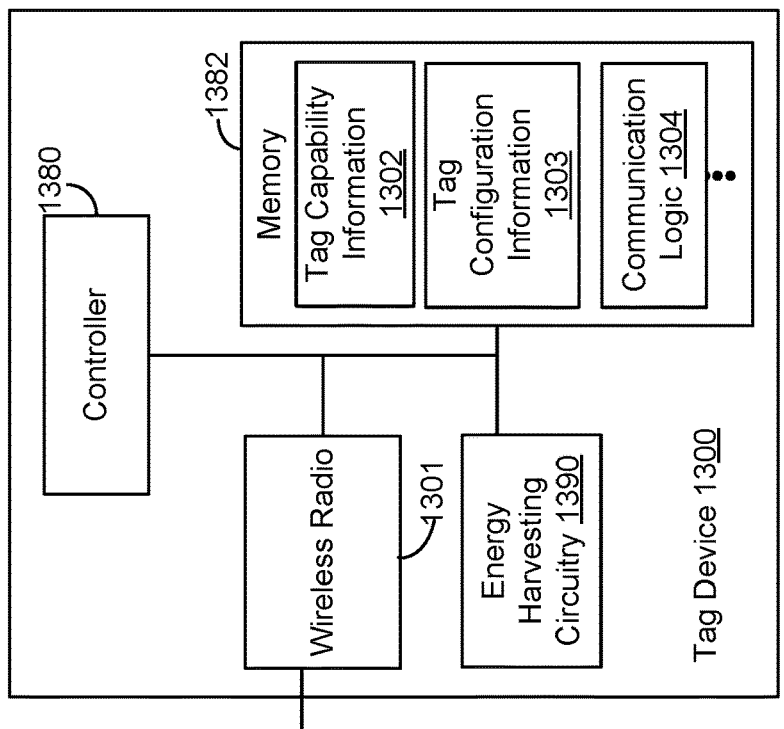
FIG. 13 is a block diagram of an example tag device that supports backscatter-based positioning according to one or more aspects.

FIG. 13 is a block diagram of an example tag device 1300 that supports backscatter-based positioning according to one or more aspects. Tag device 1300 may include or correspond to tag device 120. For example, tag device 1300 may include an RFID or IoT device.

Additionally, or alternatively, tag device may include a passive device, a semi-passive device, or an active device.

Tag device 1300 may be configured to perform operations, including the blocks of a process described with reference to FIG. 12. In some implementations, tag device 1300 includes the structure, hardware, and components shown and described with reference to tag device 120. For example, tag device 1300 includes controller 1380, which operates to execute logic or computer instructions stored in memory 1382, as well as controlling the components of tag device 1300 that provide the features and functionality of tag device 1300. Controller 1380 and memory 1382 may include or correspond to circuitry 351. Tag device 1300, under control of controller 1380, is configured to transmit and receive signals via wireless radio 1301 and antenna 1352. In some implementations, wireless radio 1301 and antenna 1352 may include or correspond to transmitter 356, receiver 358, or a combination thereof. Wireless radio 1301 includes various components and hardware. As an illustrative, non-limiting example, tag device 1300 may include, as described with reference to FIG. 2, modulator and demodulators 254a-r, MIMO detector 256, receive processor 258, transmit processor 264, and TX MIMO processor 266.

Tag device 1300 also includes energy harvesting circuitry 1390. Energy harvesting circuitry 1390 may include or correspond to circuitry 351. Energy harvesting circuitry 1390 may include hardware (e.g., circuitry), software, or a combination thereof configured to harvest energy from an energy source for tag device 1300. For example, the energy source may include a solar energy source, a vibrational energy source, a thermal energy source, or an RF energy source, as illustrative, non-limiting examples. Energy harvesting circuitry 1390 may be coupled to circuitry, such as controller 1380, memory 1382, wireless radio 1301, a power source of tag device 1300, or a combination thereof. In some implementations, the harvested energy may be used to charge a power source, such as a battery or capacitor. The power source may be coupled to controller 1380, memory 1382, wireless radio 1301, or a combination thereof. Additionally, or alternatively, the harvested energy may be configured to power one or more components of tag device 1300.

Figure 16:
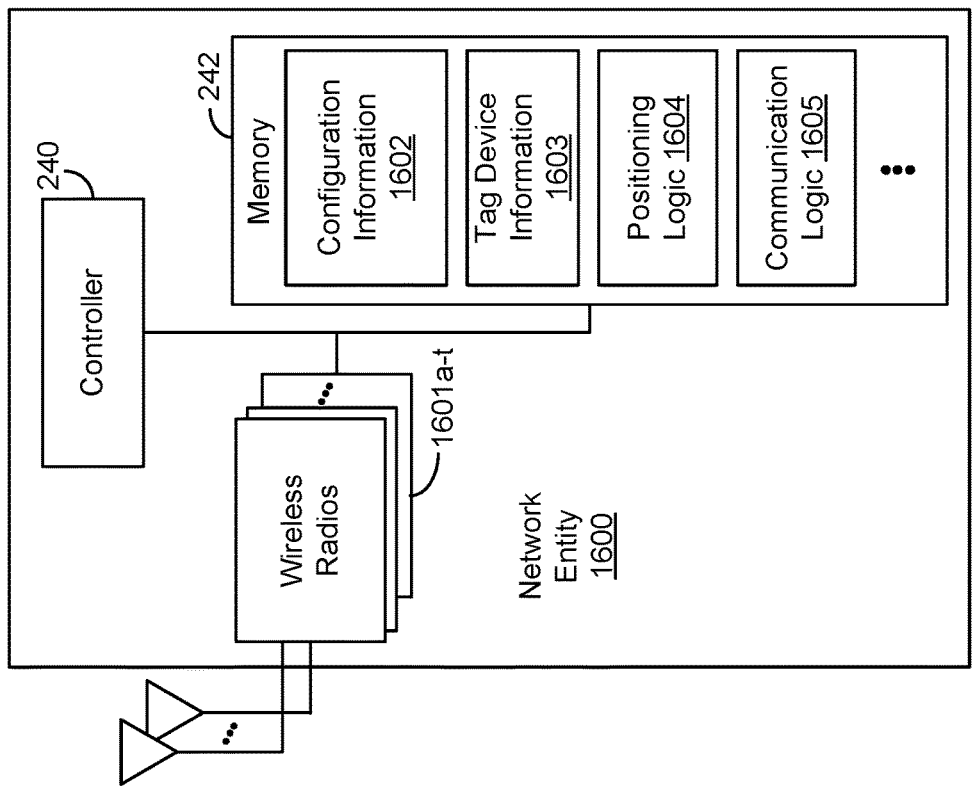
FIG. 16 is a block diagram of an example network entity that supports backscatter-based positioning according to one or more aspects.

As shown, memory 1382 may include tag capability information 1302, tag configuration information 1303, and communication logic 1304. Tag capability information 1302 may include or correspond to tag device information 309, tag device indicator 370, tag configuration 390, or a combination thereof. Tag configuration information 1303 may correspond to tag configuration 390 or the tag configuration described with reference to FIG. 4 or 5. Communication logic 1304 may be configured to enable communication between tag device 1300 and one or more other devices. Tag device 1300 may be configured to receive signals from or transmit signals to one or more network entities, base station 105, UE 115, reader device 121, core network 130, LMF 131, TRP 340, 342, 346, 348, 405, or 407, or a network entity as illustrated in FIG. 16.

It is noted that tag device 1300 may include fewer or more components than described with respect to FIG. 13. For example, in some implementations, tag device 1300 may include a power storage device. As another example, tag device 1300 may not include controller 1380.

Figure 14:
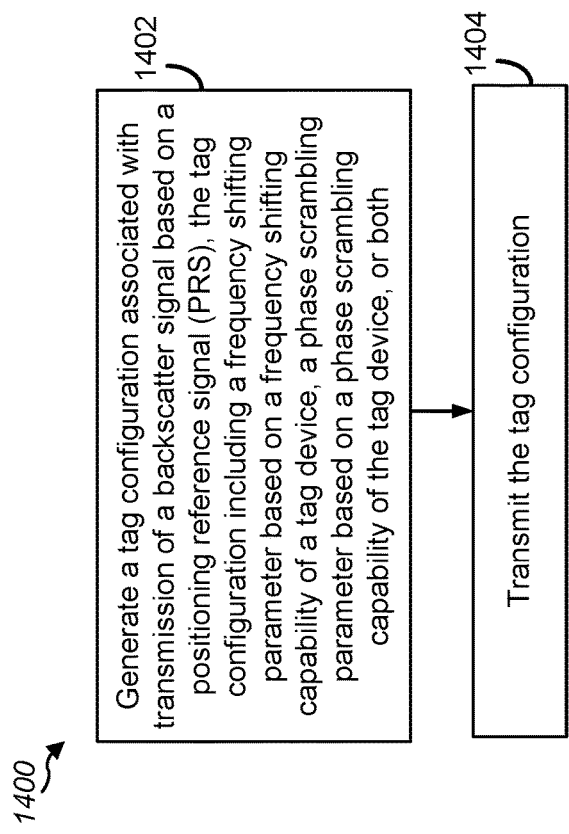
FIG. 14 is a flow diagram illustrating an example process that supports backscatter-based positioning according to one or more aspects.

FIG. 14 is a flow diagram illustrating an example process 1400 that supports backscatter-based positioning according to one or more aspects. Operations of process 1400 may be performed by a network entity, such as base station 105, UE 115, reader device 121, core network 130, LMF 131, TRP 340, 342, 346, 348, 405, or 407, or a network entity as described with reference to FIG. 16. For example, example operations of process 1400 may enable the network entity to support backscatter-based positioning. In some implementations, the network entity may include or correspond to a network, a base station, reader device 121, core network 130, LMF 131, a TRP, a combination thereof, as illustrate, non-limiting examples.

At block 1402, a network entity generates a tag configuration. For example, the tag configuration may include or correspond to tag configuration 390. The tag configuration includes a frequency shifting parameter based on a frequency shifting capability of a tag device, a phase scrambling parameter based on a phase scrambling capability of the tag device, or a combination thereof. The tag device may include or correspond to tag device 120. At block 1404, the network entity transmits the tag configuration.

In some implementations, the network entity receive a tag device indicator that indicates a tag capability associated with a tag device. For example, the tag indicator may include or correspond to tag device indicator 370. The tag capability may include or indicate the frequency shifting capability, the phase scrambling capability, or a combination thereof. In some implementations, the tag capability includes or indicates the frequency shifting capability and the phase scrambling capability.

In some implementations, the network entity transmits a TRP configuration, such as TRP configuration 372. The TRP configuration may include a PRS configuration, a measurement gap configuration, or a combination thereof. For example, the PRS configuration and the measurement gap configuration may include or correspond to PRS configuration 381 and MG configuration 382, respectively. In some implementations, the PRS configuration includes or indicates the frequency shifting parameter, the phase scrambling parameter, a PRS time offset value, or a combination thereof.

In some implementations, the PRS configuration includes a backscatter frequency offset value of the backscatter signal, a waveform corresponding to the PRS, a bandwidth corresponding to the PRS, a sequence type corresponding to the PRS, a sequence length corresponding to the PRS, or a combination thereof. In some implementations, the network entity receives, from a TRP, a measurement report, such as measurement report 378. The measurement report may indicate a channel condition measured or experienced by the TRP, an interference measured or experienced by the TRP, or a combination thereof. In some implementations, the network entity determines, based on the measurement report, a position of the tag device. The position may include a two-dimensional position, a three dimensional position, or a combination thereof. In some implementations, the tag configuration is generated based on a measurement report, and the interference may include or correspond to interference associated with the backscatter signal, such as interference 444 or 450.

In some implementations, the frequency shifting capability includes a bandwidth of the backscatter signal, frequency shift waveforms configurable by the tag device, a time delay associated with switching a frequency of the backscatter signal, an amount of time during which the tag device is configurable to perform frequency shifting operations, a power level available, at the tag device, for performing the frequency shifting operations, or a combination thereof. In some implementations, the frequency shifting parameter includes a backscatter frequency offset value of the backscatter signal (e.g., fs), an indication of frequency shift waveform (e.g., a single sided frequency shift, a double-sided frequency shift, a double-sided frequency shift with a ninety degree phase shift, a square waveform frequency shift, etc.), a timeframe during which a frequency shifting operation is to be performed, or a combination thereof. The frequency shifting parameter may be configured based on the frequency shifting capability.

In some implementations, the phase scrambling capability includes supported phase values of the tag device, scaling factor values selectable by the tag device, an amount of time during which a phase scattering operation is performable, an amount of power available to the tag device to perform the phase scattering operation, or a combination thereof. For example, the supported phase values may be values selected from a set such as $\{\pi,-\pi\}$ or $\{\pi/2,-\pi/2, \pi,-\pi\}$. As another example, the scaling factor may be a value of a variable K such that f tag device=f Tx TRP/K).

In some implementations, the phase scrambling parameter includes a scaling factor, a phase sequence with phase shifts, a length of the phase sequence, or a combination thereof. For example, the phase sequence with phase shifts may include or correspond to values such as binary phase-shift keying (BPSK) (e.g., {1, −1}) such as described with reference to FIG. 7, quadrature phase shift keying (QPSK) (e.g., {1, j, −1, −j}), or both. In some implementations, the phase scrambling parameter is generated based on the phase scrambling capability.

Figure 15:
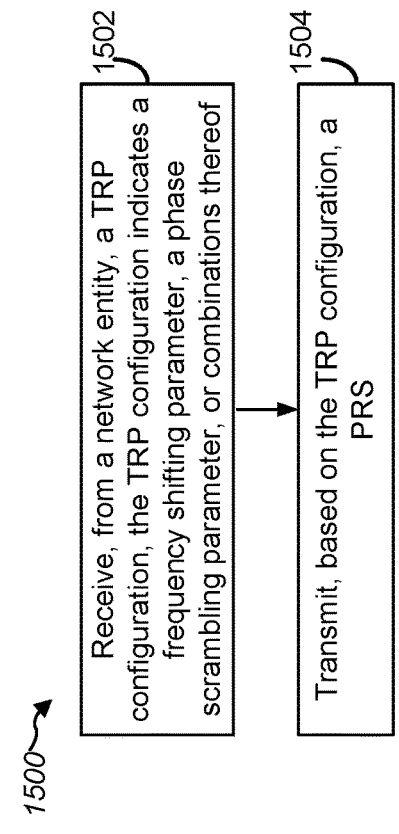
FIG. 15 is a flow diagram illustrating an example process that supports backscatter-based positioning according to one or more aspects.

FIG. 15 is a flow diagram illustrating an example process 1500 that supports backscatter-based positioning according to one or more aspects. Operations of process 1500 may be performed by a network entity, such as base station 105, UE 115, reader device 121, core network 130, LMF 131, TRP 340, 342, 346, 348, 405, or 407, or a network entity as described with reference to FIG. 16. For example, example operations of process 1400 may enable the network entity to support backscatter-based positioning. In some implementations, the network entity is a TRP or a reader device. Additionally, or alternatively, the network entity (e.g., the TRP) may be configured to operate in a full duplex mode.

At block 1502, the network entity receives a TRP configuration. To example, the TRP configuration may include or correspond to TRP configuration 372. In some implementations, the TRP configuration is received from another network entity, such as core network 130 or LMF 131. The TRP configuration may include or indicates a frequency shifting parameter, a phase scrambling parameter, or a combination thereof. In some implementations, the TRP configuration includes or indicates the frequency shifting parameter and the phase scrambling parameter.

At block 1504, the network entity transmits, based on the TRP configuration, a PRS. For example, the PRS may include or correspond to PRS 374 or 431. In some implementations, the PRS is transmitted to a tag device, such as tag device 120. The TRP may receive a backscatter signal from the tag device in response to the transmitted PRS. For example, the backscatter signal may include or correspond to backscatter signal 376, a frequency shifted backscatter signal (e.g., 441), a phase scrambled backscatter signal 441, or a combination thereof. In some implementations, the received backscatter signal may include interference, such as interference 444 or 450. Accordingly, the network entity may be configured to process the received backscattered signal to remove interference from the backscatter signal. The network entity may generate a measurement report (e.g., 378) based on the received backscattered signal, processing to remove interference from the received backscattered signal, or a combination thereof. To illustrate, the measurement report may include signal processing data corresponding to the received backscatter signal, such as types of interference detected in the received backscatter signal. For example, the measurement report may identify a type and a magnitude of interference in a backscatter signal received from a tag device in response to transmission of the PRS. The network entity may transmit the measurement report, such as to the other network entity.

In some implementations, the network entity may configure the PRS based on the signal processing data, such as generating a PRS configured to improve a resolution of the received backscatter signal. For example, the PRS may be configured to have a long sequence for greater processing gain, a wider bandwidth for enhancing timing resolution, or both.

In some implementations, the network entity determines a PRS time offset value (e.g., $t_c$) based on the backscatter signal and the frequency shifting parameter (e.g., frequency shift waveform). For example, the network entity may determine the PRS time offset value by removing a frequency shifting offset from the backscatter signal, passing the backscatter signal through a low pass filter, and correlating the PRS with randomly selected time offset values to identify the time offset value. The frequency shifting offset may be included in the frequency shifting parameter.

In some implementations, the received backscatter signal is phase scrambled. In such a case, the network entity may be configured to descramble the phase scrambled backscatter signal based on the frequency shifting parameter, the phase scrambling parameter, or a combination thereof. In some implementations, the network entity may be configured to descramble the phase scrambled backscatter signal by identifying a backscatter signal time offset value (e.g., $t_b$), identifying a PRS time offset value (e.g., $t_c$), and correlating the PRS and backscatter signal based on the PRS time offset value and the backscatter signal value.

In some implementations, the network entity may be configured to extract, cancel, or negate interference from the backscatter signal by correlating the PRS and the backscatter signal based on the PRS time offset value and the backscatter signal time offset value.

For example, the network entity may be configured to iteratively update the PRS time offset value and the backscatter signal time offset value until the interference is extracted. In some implementations, identifying the backscatter signal time offset value includes randomly testing candidate backscatter signal time offset values selected from a period of the backscatter signal. Moreover, in some implementations identifying the PRS time offset value includes randomly testing candidate PRS time offset values.

FIG. 16 is a block diagram of an example network entity 1600 that supports backscatter-based positioning according to one or more aspects. Network entity 1600 may include or correspond to core network 130, LMF 131, reader device 121, TRP 340, 342, 346, 348, 405, or 407, UE 115, or base station 105. Network entity 1600 may be configured to perform operations, including the blocks of processes 1400 or 1500. In some implementations, network entity 1600 includes the structure, hardware, and components shown and described with reference to base station 105 or UE 115 of FIG. 1 or 2. As an illustrative example, network entity 1600 may include controller 240, which operates to execute logic or computer instructions stored in memory 242, as well as controlling the components of network entity 1600 that provide the features and functionality of network entity 1600. Network entity 1600, under control of controller 240, transmits and receives signals via wireless radios 1601a-t and antennas 234a-t. Wireless radios 1601a-t include various components and hardware, as illustrated in FIG. 2 for base station 105, including modulator and demodulators 232a-t, transmit processor 220, TX MIMO processor 230, MIMO detector 236, and receive processor 238.

As shown, the memory 242 may include configuration information 1602, tag device information 1603, positioning logic 1604, and communication logic 1605. Configuration information 1602 may include or correspond to PRS information 307, measurement gap information 308, tag device information 309, TRP configuration 372, PRS configuration 381, MG configuration 382, or a tag configuration 390. Tag device information 1603 may include or correspond to information 306, tag device information 309, or tag device indicator 370. Positioning logic 1604 may be configured to determine a position of a tag device based on one or more measurement reports, such as measurement report 378 or measurement information 310. Communication logic 1605 may be configured to enable communication between network entity 1600 and one or more other devices. Network entity 1600 may receive signals from or transmit signals to one or more devices, such as base station 105, UE 115, tag device 120, reader device 121, core network 130, LMF 131, TRP 340, 342, 346, 348, 405, or 407, or another device.

It is noted that one or more blocks (or operations) described with reference to FIG. 12, 14, or 15 may be combined with one or more blocks (or operations) described with reference to another of the figures. For example, one or more blocks (or operations) of FIG. 14 may be combined with one or more blocks (or operations) of FIG. 15. As another example, one or more blocks associated with FIG. 12 may be combined with one or more blocks associated with FIG. 14. As another example, one or more blocks associated with FIG. 12, 14, or 15 may be combined with one or more blocks (or operations) associated with FIGS. 1-5. Additionally, or alternatively, one or more operations described above with reference to FIGS. 1-5 may be combined with one or more operations described with reference to FIG. 13 or 16.

In one or more aspects, techniques for supporting backscatter-based positioning may include additional aspects, such as any single aspect or any combination of aspects described below or in connection with one or more other processes or devices described elsewhere herein. In a first aspect, techniques for supporting backscatter-based positioning may include generating a tag configuration associated with transmission of a backscatter signal based on a PRS. The tag configuration indicates a frequency shifting parameter based on a frequency shifting capability of a tag device, a phase scrambling parameter based on a phase scrambling capability of the tag device, or a combination thereof. The techniques may further include transmitting the tag configuration. In some examples, the techniques in the first aspect may be implemented in a method or process. In some other examples, the techniques of the first aspect may be implemented in a communication device or a communication system. For example, the communication device may include wireless communication device, such as a network entity, a core network, an LMF, a UE, a base station, a reader device, a TRP, or a component thereof. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a second aspect, in combination with the first aspect, the techniques further include receiving a tag device indicator that indicates a tag capability, the tag capability including the frequency shifting capability, the phase scrambling capability, or a combination thereof.

In a third aspect, in combination with the first aspect or the second aspect, the frequency shifting capability includes a bandwidth of the backscatter signal, frequency shift waveforms configurable by the tag device, a time delay associated with switching a frequency of the backscatter signal, an amount of time during which the tag device is configurable to perform frequency shifting operations, a power level available, at the tag device, for performing the frequency shifting operations, or a combination thereof.

In a fourth aspect, in combination with one or more of the first aspect through the third aspect, the frequency shifting parameter includes a backscatter frequency offset value of the backscatter signal, an indication of frequency shift waveform, a timeframe during which a frequency shifting operation is to be performed, or a combination thereof.

In a fifth aspect in combination with the fourth aspect, the frequency shifting parameter is configured based on the frequency shifting capability.

In a sixth aspect, in combination with one or more of the first aspect through the fifth aspect. the techniques further include transmitting a TRP configuration.

In a seventh aspect, in combination with the sixth aspect, the TRP configuration includes a PRS configuration, a measurement gap configuration, or a combination thereof.

In an eighth aspect, in combination with the seventh aspect, the PRS configuration includes the frequency shifting parameter, the phase scrambling parameter, a PRS time offset value, or a combination thereof.

In a ninth aspect, in combination with the seventh aspect or the eighth aspect, the PRS configuration includes a backscatter frequency offset value of the backscatter signal, a waveform corresponding to the PRS, a bandwidth corresponding to the PRS, a sequence type corresponding to the PRS, a sequence length corresponding to the PRS, or a combination thereof.

In a tenth aspect, in combination with one or more of the first aspect through the ninth aspect, the techniques further include receiving, from a TRP, a measurement report that indicates a channel condition experienced by the TRP, an interference experienced by the TRP, or a combination thereof.

In an eleventh aspect, in combination with the tenth aspect, the techniques further include determining, based on the measurement report, a position of the tag device.

In a twelfth aspect, in combination with the tenth aspect or the eleventh aspect, the tag configuration is generated based on the measurement report.

In a thirteenth aspect, in combination with one or more of the tenth aspect through the twelfth aspect, the interference corresponds to interference with the backscatter signal.

In a fourteenth aspect, in combination with one or more of the first aspect through the thirteenth aspect, the phase scrambling capability includes supported phase values of the tag device, scaling factor values selectable by the tag device, an amount of time during which a phase scattering operation is performable, an amount of power available to the tag device to perform the phase scattering operation, or a combination thereof.

In a fifteenth aspect, in combination with one or more of the first aspect through the fourteenth aspect, the phase scrambling parameter includes a scaling factor, a phase sequence with phase shifts, a length of the phase sequence, or a combination thereof.

In a sixteenth aspect, in combination with one or more of the first aspect through the fifteenth aspect, the tag configuration indicates the frequency shifting parameter and the phase scrambling parameter.

In one or more aspects, techniques for supporting backscatter-based positioning may include additional aspects, such as any single aspect or any combination of aspects described below or in connection with one or more other processes or devices described elsewhere herein. In a seventeenth aspect, techniques for supporting backscatter-based positioning may include receiving, from a network entity, a TRP configuration that indicates a frequency shifting parameter, a phase scrambling parameter, or a combination thereof. The techniques may further include transmitting, based on the TRP configuration, a PRS. In some examples, the techniques in the seventeenth aspect may be implemented in a method or process. In some other examples, the techniques of the seventeenth aspect may be implemented in a wireless communication device, such as a TRP, which may include a network entity, a base station, a reader device, a UE, or a component thereof. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In an eighteenth aspect, in combination with the seventeenth aspect, the techniques further include transmitting, to the network entity, a measurement report.

In a nineteenth aspect, in combination with the eighteenth aspect, the measurement report indicates a type and a magnitude of interference in a backscatter signal received from a tag device in response to transmission of the PRS.

In a twentieth aspect, in combination with one or more of the seventeenth aspect the techniques further include receiving a backscatter signal from a tag device in response to the PRS.

In a twenty-first aspect, in combination with the twentieth aspect, the techniques further include removing interference from the backscatter signal.

In a twenty-second aspect, in combination with the twenty-first aspect, the techniques further include transmitting a measurement report.

In a twenty-third aspect, in combination with the twenty-second aspect, the measurement report includes signal processing data corresponding to the backscatter signal.

In a twenty-fourth aspect, in combination with the twenty-third aspect, the techniques further include determining a PRS time offset value based on the backscatter signal and the frequency shifting parameter.

In a twenty-fifth aspect, in combination with the twenty-fourth aspect, to determine the PRS time offset value, the techniques further include removing a frequency shifting offset from the backscatter signal, the frequency shifting parameter indicates the frequency shifting offset.

In a twenty-sixth aspect, in combination with the twenty-fifth aspect, the techniques further include passing the backscatter signal through a low pass filter.

In a twenty-seventh aspect, in combination with the twenty-sixth aspect, the techniques further include correlating the PRS with randomly selected time offset values to identify the PRS time offset value.

In a twenty-eighth aspect, in combination with the twenty-third aspect, the backscatter signal is phase scrambled.

In a twenty-ninth aspect, in combination with the twenty-eighth aspect, the techniques further include descrambling the phase scrambled backscatter signal based on the frequency shifting parameter, the phase scrambling parameter, or a combination thereof.

In a thirtieth aspect, in combination with the twenty-ninth aspect, to descramble the phase scrambled backscatter signal, the techniques further include identifying a backscatter signal time offset value.

In a thirty-first aspect, in combination with the thirtieth aspect, to descramble the phase scrambled backscatter signal, the techniques further include identifying a PRS time offset value.

In a thirty-second aspect, in combination with the thirty-first aspect, to descramble the phase scrambled backscatter signal, the techniques further include correlating the PRS and backscatter signal based on the PRS time offset value and the backscatter signal time offset value.

In a thirty-third aspect, in combination with the thirty-second aspect, the techniques further include extracting interference from the backscatter signal by correlating the PRS and the backscatter signal based on the PRS time offset value and the backscatter signal time offset value.

In a thirty-fourth aspect, in combination with the thirty-third aspect, the techniques further include iteratively updating the PRS time offset value and the backscatter signal time offset value until the interference is extracted.

In a thirty-fifth aspect, in combination with the thirty-second aspect, to identify the backscatter signal time offset value, the techniques further include randomly testing candidate backscatter signal time offset values selected from a period of the backscatter signal.

In a thirty-sixth aspect, in combination with the thirty-second aspect, the techniques further include randomly testing candidate PRS time offset values.

In one or more aspects, techniques for supporting backscatter-based positioning may include additional aspects, such as any single aspect or any combination of aspects described below or in connection with one or more other processes or devices described elsewhere herein. In a thirty-seventh aspect, techniques for supporting backscatter-based positioning may include receiving a tag configuration that indicates a frequency shifting parameter based on a frequency shifting capability of the tag device, a phase scrambling parameter based on a phase scrambling capability of the tag device, or a combination thereof. The techniques may further include transmitting, based on the tag configuration, a backscatter signal in response to a PRS. In some examples, the techniques in the thirty-seventh aspect may be implemented in a method or process. In some other examples, the techniques of the thirty-seventh aspect may be implemented in a wireless communication device, such as a tag device or IoT device, which may include a passive tag, a semi-passive tag, an active tag, a UE, an RFID, or a component thereof. In some examples, the wireless communication device may include circuitry, such as at least one processing unit or system (which may include an application processor, a modem or other components) and at least one memory device coupled to the processing unit, as illustrative, non-limiting examples. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a thirty-eighth aspect, in combination with the thirty-seventh aspect, the techniques further include transmitting, to a network entity, a tag device indicator that indicates a tag capability of the tag device, the tag capability including the frequency shifting capability, the phase scrambling capability, or both.

In a thirty-ninth aspect, in combination with the thirty-seventh aspect or the thirty-eighth aspect, the techniques further include receiving the PRS from a TRP, the PRS is configured based on a PRS configuration received from the network entity.

In a fortieth aspect, in combination with one or more of the thirty-seventh aspect through the thirty-ninth aspect, the techniques further include generating the backscatter signal based on the PRS.

In a forty-first aspect, in combination with one or more of the thirty-seventh aspect through the fortieth aspect, the techniques further include determining, based on the tag configuration, the frequency shifting parameter, the phase scrambling parameter, or a combination thereof.

In a forty-second aspect, in combination with one or more of the thirty-seventh aspect through the forty-first aspect, the techniques further include configuring one or more components of the tag device based on the frequency shifting parameter, the phase scrambling parameter, or a combination thereof.

In a forty-third aspect, in combination with one or more of the thirty-seventh aspect through the forty-second aspect, the techniques further include generating the backscatter signal based on the frequency shifting parameter, the phase scrambling parameter, or both.

In a forty-fourth aspect, in combination with one or more of the thirty-seventh aspect through the forty-third aspect, the tag configuration indicates the frequency shifting parameter and the phase scrambling parameter.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-16 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or a combination thereof.

Those of skill would further appreciate that the various illustrative logical blocks, modules, circuits, and algorithm steps described in connection with the disclosure herein may be implemented as electronic hardware, computer software, or a combination of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or a combination of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation.

Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a network entity, the method comprising:
   receiving a tag device indicator that indicates a tag capability, the tag capability including the frequency shifting capability, the phase scrambling capability, or a combination thereof;
   generating a tag configuration associated with transmission of a backscatter signal based on a positioning reference signal (PRS), the tag configuration indicating:
      a frequency shifting parameter based on a frequency shifting capability of a tag device,
      a phase scrambling parameter based on a phase scrambling capability of the tag device, or
      a combination thereof; and
   transmitting the tag configuration.

2. The method of claim 1, wherein the frequency shifting capability includes a bandwidth of the backscatter signal, frequency shift waveforms configurable by the tag device, a time delay associated with switching a frequency of the backscatter signal, an amount of time during which the tag device is configurable to perform frequency shifting operations, a power level available, at the tag device, for performing the frequency shifting operations, or a combination thereof.

3. The method of claim 1, wherein:
the frequency shifting parameter includes a backscatter frequency offset value of the backscatter signal, an indication of frequency shift waveform, a timeframe during which a frequency shifting operation is to be performed, or a combination thereof, and
the frequency shifting parameter is configured based on the frequency shifting capability.

4. The method of claim 1, further comprising:
transmitting a transmit/receive point (TRP) configuration, and
wherein the TRP configuration includes a PRS configuration, a measurement gap configuration, or a combination thereof.

5. The method of claim 4, wherein the PRS configuration includes the frequency shifting parameter, the phase scrambling parameter, a PRS time offset value, or a combination thereof.

6. The method of claim 5, wherein the PRS configuration includes a backscatter frequency offset value of the backscatter signal, a waveform corresponding to the PRS, a bandwidth corresponding to the PRS, a sequence type corresponding to the PRS, a sequence length corresponding to the PRS, or a combination thereof.

7. The method of claim 1, further comprising:
receiving, from a transmit/receive point (TRP), a measurement report that indicates a channel condition experienced by the TRP, an interference experienced by the TRP, or a combination thereof; and
determining, based on the measurement report, a position of the tag device, and
wherein:
the tag configuration is generated based on the measurement report, and
the interference corresponds to interference with the backscatter signal.

8. The method of claim 1, wherein the phase scrambling capability includes supported phase values of the tag device, scaling factor values selectable by the tag device, an amount of time during which a phase scattering operation is performable, an amount of power available to the tag device to perform the phase scattering operation, or a combination thereof.

9. The method of claim 1, wherein the phase scrambling parameter includes a scaling factor, a phase sequence with phase shifts, a length of the phase sequence, or a combination thereof.

10. The method of claim 1, wherein the tag configuration indicates the frequency shifting parameter and the phase scrambling parameter.

11. A method of wireless communication performed by a transmission/reception point (TRP), the method comprising:
transmitting, to the network entity, a measurement report, wherein the measurement report indicates a type and a magnitude of interference in a backscatter signal received from a tag device in response to transmission of the PRS;
receiving, from a network entity, a TRP configuration that indicates:
a frequency shifting parameter,
a phase scrambling parameter, or
a combination thereof; and
transmitting, based on the TRP configuration, a PRS.

12. The method of claim 11, further comprising:
receiving a backscatter signal from a tag device in response to the PRS;
removing interference from the backscatter signal;
transmitting a measurement report, wherein the measurement report includes signal processing data corresponding to the backscatter signal; and
determining a PRS time offset value based on the backscatter signal and the frequency shifting parameter.

13. The method of claim 12, wherein determining the PRS time offset value comprises:
removing a frequency shifting offset from the backscatter signal, the frequency shifting parameter indicates the frequency shifting offset;
passing the backscatter signal through a low pass filter; and
correlating the PRS with randomly selected time offset values to identify the PRS time offset value.

14. The method of claim 11, further comprising:
receiving a backscatter signal from a tag device in response to the PRS;
removing interference from the backscatter signal; and
transmitting a measurement report, wherein the measurement report includes signal processing data corresponding to the backscatter signal, and
wherein the backscatter signal is phase scrambled.

15. The method of claim 14, further comprising:
descrambling the phase scrambled backscatter signal based on the frequency shifting parameter, the phase scrambling parameter, or a combination thereof.

16. The method of claim 15, wherein descrambling the phase scrambled backscatter signal includes:
identifying a backscatter signal time offset value;
identifying a PRS time offset value; and
correlating the PRS and backscatter signal based on the PRS time offset value and the backscatter signal time offset value.

17. The method of claim 16, further comprising:
extracting interference from the backscatter signal by correlating the PRS and the backscatter signal based on the PRS time offset value and the backscatter signal time offset value; and
iteratively updating the PRS time offset value and the backscatter signal time offset value until the interference is extracted.

18. The method of claim 16, wherein identifying the backscatter signal time offset value includes randomly testing candidate backscatter signal time offset values selected from a period of the backscatter signal.

19. The method of claim 16, wherein identifying the PRS time offset value includes randomly testing candidate PRS time offset values.

20. A method of wireless communication performed by a tag device, the method comprising:
transmitting, to a network entity, a tag device indicator that indicates a tag capability of the tag device, the tag capability including the frequency shifting capability, the phase scrambling capability, or both;
receiving a tag configuration that indicates:
a frequency shifting parameter based on a frequency shifting capability of the tag device,
a phase scrambling parameter based on a phase scrambling capability of the tag device, or
a combination thereof; and
transmitting, based on the tag configuration, a backscatter signal in response to a positioning reference signal (PRS).

21. The method of claim 20, further comprising:
receiving the PRS from a transmit/receive point (TRP), wherein the PRS is configured based on a PRS configuration received from the network entity; and
generating the backscatter signal based on the PRS.

22. The method of claim 20, further comprising:
determining, based on the tag configuration, the frequency shifting parameter, the phase scrambling parameter, or a combination thereof; and
configuring one or more components of the tag device based on the frequency shifting parameter, the phase scrambling parameter, or a combination thereof.

23. The method of claim 20, further comprising:
generating the backscatter signal based on the frequency shifting parameter, the phase scrambling parameter, or both.

24. The method of claim 20, wherein the tag configuration indicates the frequency shifting parameter and the phase scrambling parameter.

25. An apparatus for wireless communication, the apparatus including:
at least one processor; and
a memory coupled to the at least one processor, wherein the at least one processor is configured to:
receive, from a network entity, a transmit/receive point (TRP) configuration that indicates a frequency shifting parameter, a phase scrambling parameter, or a combination thereof, wherein the frequency shifting parameter includes a backscatter frequency offset value of a backscatter signal and a timeframe during which a frequency shifting operation is to be performed, and wherein the frequency shifting parameter is configured based on a frequency shifting capability of the tag device; and
initiate transmission of a positioning reference signal (PRS) to a tag device.

26. The apparatus of claim 25, further comprising:
receiving a backscatter signal from the tag device in response to the PRS.

27. The apparatus of claim 25, wherein:
the phase scrambling parameter includes a scaling factor, a phase sequence with phase shifts, a length of the phase sequence, or a combination thereof, and
the phase scrambling parameter is based on a phase scrambling capability of the tag device.

* * * * *